US012672060B2

(12) United States Patent
Abotabl et al.

(10) Patent No.: US 12,672,060 B2
(45) Date of Patent: Jun. 30, 2026

(54) TECHNIQUES FOR DYNAMIC CELL ACTIVATION AND DEACTIVATION IN WIRELESS COMMUNICATIONS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Kazuki Takeda, Minato-ku (JP)

(73) Assignee: QUALCOMM Incorporated, San Diego, CA (US)

( * ) Notice: Subject to any disclaimer, the term of this patent is extended or adjusted under 35 U.S.C. 154(b) by 502 days.

(21) Appl. No.: 18/175,491

(22) Filed: Feb. 27, 2023

(65) Prior Publication Data

US 2024/0292323 A1　　Aug. 29, 2024

(51) Int. Cl.
| | |
|---|---|
| *H04W 52/02* | (2009.01) |
| *H04W 8/22* | (2009.01) |
| *H04W 72/1268* | (2023.01) |
| *H04W 72/21* | (2023.01) |

(52) U.S. Cl.
CPC ......... *H04W 52/0206* (2013.01); *H04W 8/22* (2013.01); *H04W 72/1268* (2013.01); *H04W 72/21* (2023.01)

(58) Field of Classification Search
CPC ............. H04W 52/0206; H04W 72/21; H04W 72/1268; H04W 8/22

USPC .......................................................... 370/318
See application file for complete search history.

(56) References Cited

U.S. PATENT DOCUMENTS

| | | | | |
|---|---|---|---|---|
| 2015/0110010 A1* | 4/2015 | Wei | ...................... | H04B 7/2656 |
| | | | | 370/329 |
| 2020/0344729 A1* | 10/2020 | Park | ...................... | H04L 5/0053 |
| 2021/0167930 A1* | 6/2021 | Jeon | ...................... | H04L 5/0098 |
| 2023/0102290 A1* | 3/2023 | Babaei | .................. | H04L 5/0098 |
| | | | | 370/329 |

* cited by examiner

*Primary Examiner* — Chi Tang P Cheng
(74) *Attorney, Agent, or Firm* — Holland & Hart LLP/Qualcomm Incorporated

(57) ABSTRACT

Methods, systems, and devices for wireless communications are described that provide for dynamic cell activation and deactivation. A network entity may configure one or more cells for dynamic activation and deactivation, and a UE may provide information to the network entity to allow efficient scheduling and cell activation and deactivation. A UE may provide a capability indication of support for dynamic cell activation and deactivation, along with information such as supported switching times, supported rates of activation and deactivation, a number of cells that can be activated and deactivated, or any combinations thereof. In some cases, a UE may provide UE assistance information to the network, such as in configured periodic reporting, in aperiodic reporting that is activated based on a trigger from the network, in response to a network request, or any combinations thereof.

28 Claims, 17 Drawing Sheets

130

105

115

Network
Entity

Transceiver

1210

Antenna

1215

Communications
Manager

1220

Memory

Code

1230

1225

1240

Processor

1235

1205

1200

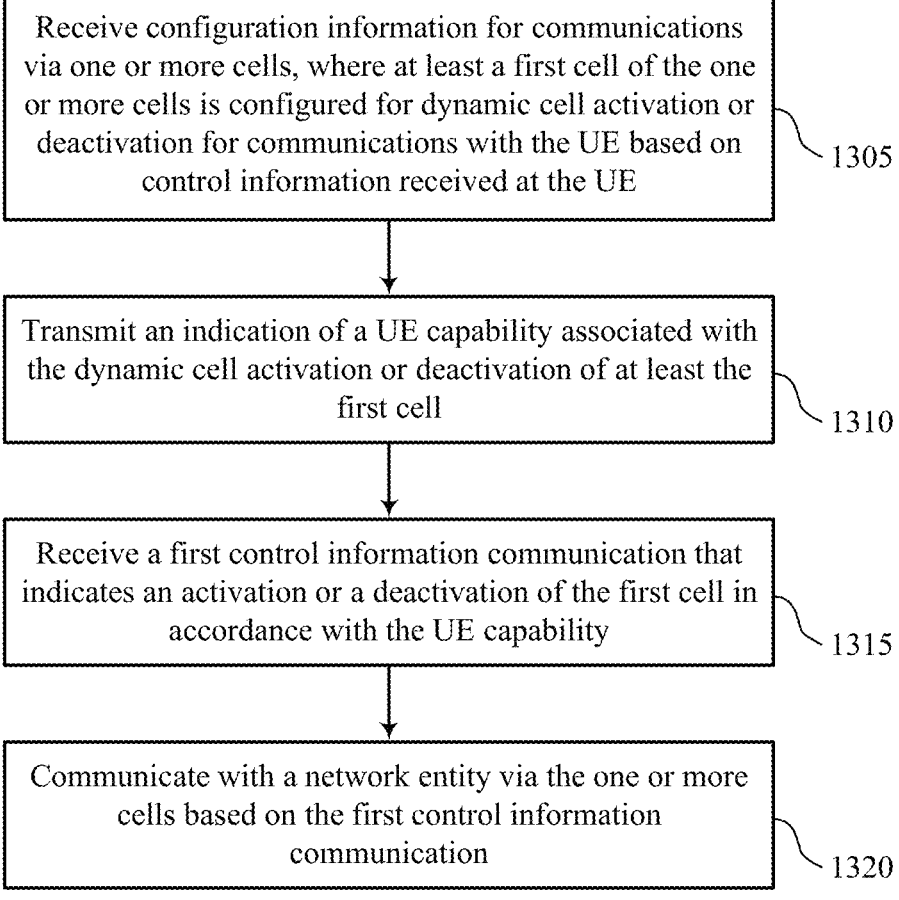

Receive configuration information for communications via one or more cells, where at least a first cell of the one or more cells is configured for dynamic cell activation or deactivation for communications with the UE based on control information received at the UE

1305

Transmit an indication of a UE capability associated with the dynamic cell activation or deactivation of at least the first cell

1310

Receive a first control information communication that indicates an activation or a deactivation of the first cell in accordance with the UE capability

1315

Communicate with a network entity via the one or more cells based on the first control information communication

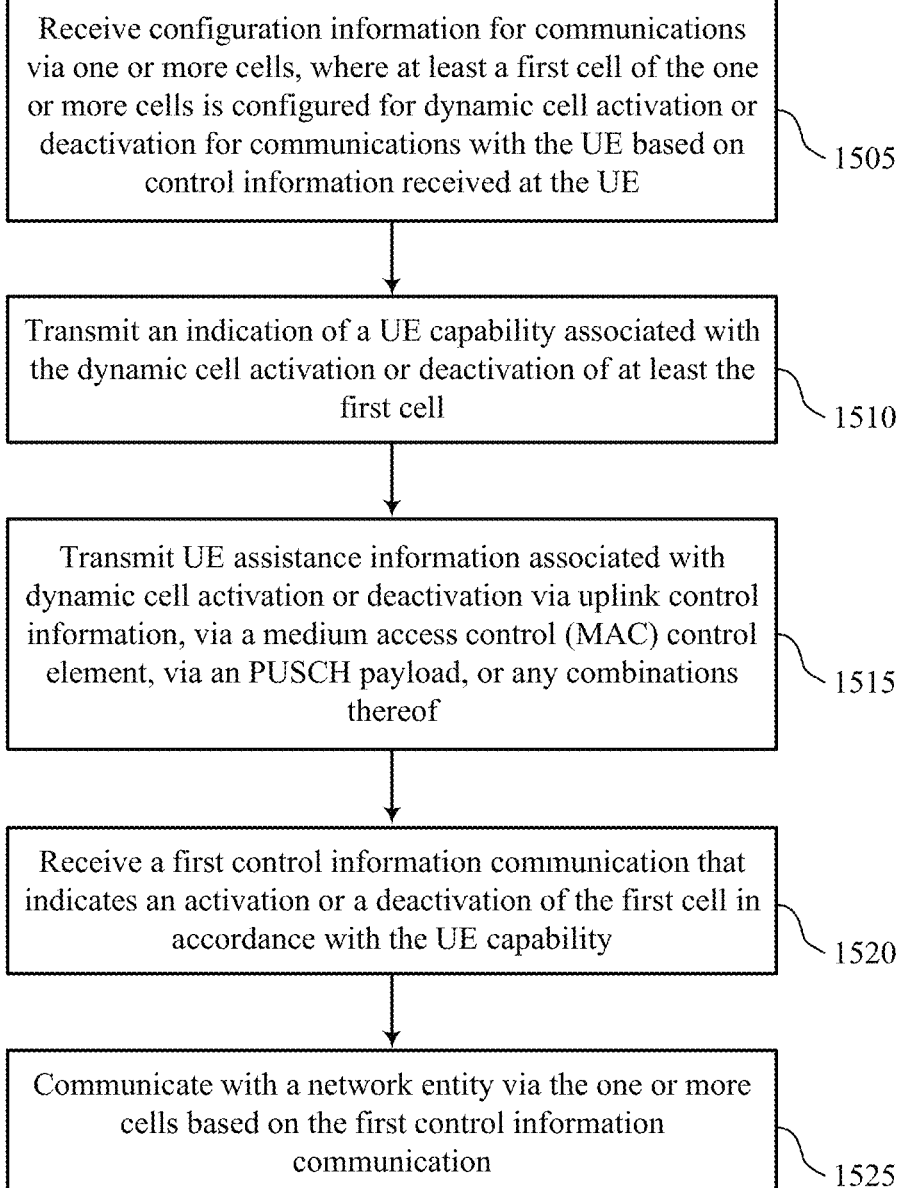

Receive configuration information for communications via one or more cells, where at least a first cell of the one or more cells is configured for dynamic cell activation or deactivation for communications with the UE based on control information received at the UE ⌐1505

Transmit an indication of a UE capability associated with the dynamic cell activation or deactivation of at least the first cell ⌐1510

Transmit UE assistance information associated with dynamic cell activation or deactivation via uplink control information, via a medium access control (MAC) control element, via an PUSCH payload, or any combinations thereof ⌐1515

Receive a first control information communication that indicates an activation or a deactivation of the first cell in accordance with the UE capability ⌐1520

Communicate with a network entity via the one or more cells based on the first control information communication ⌐1525

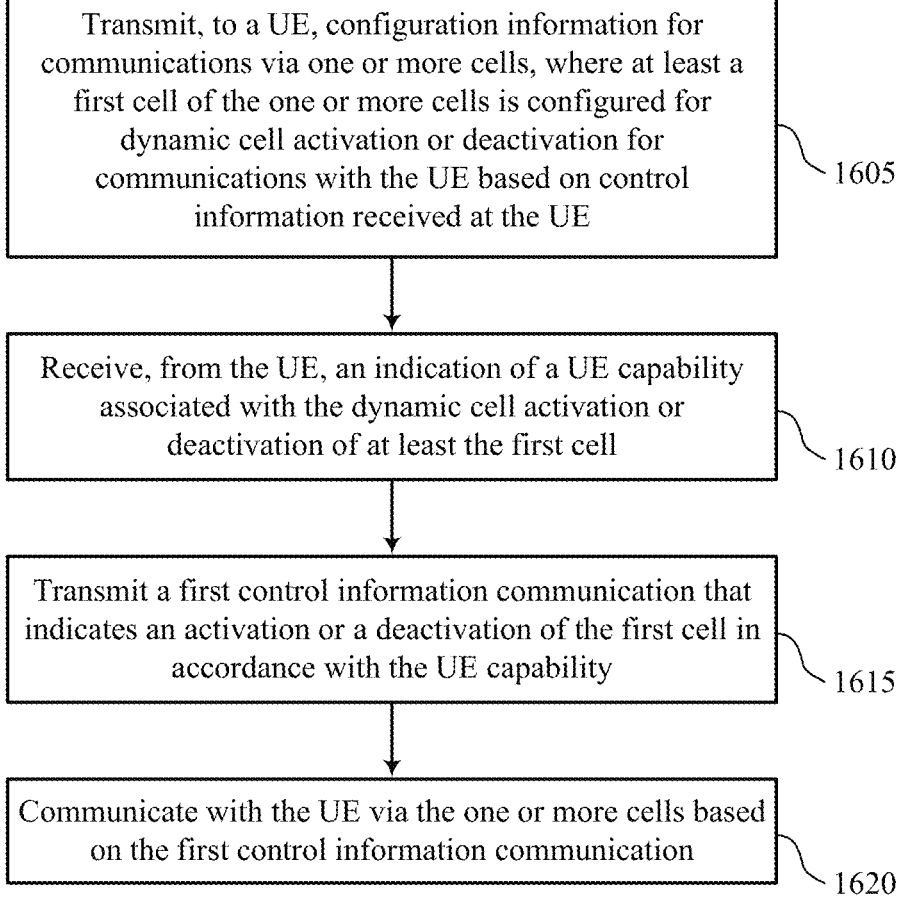

Transmit, to a UE, configuration information for communications via one or more cells, where at least a first cell of the one or more cells is configured for dynamic cell activation or deactivation for communications with the UE based on control information received at the UE

1605

Receive, from the UE, an indication of a UE capability associated with the dynamic cell activation or deactivation of at least the first cell

1610

Transmit a first control information communication that indicates an activation or a deactivation of the first cell in accordance with the UE capability

1615

Communicate with the UE via the one or more cells based on the first control information communication

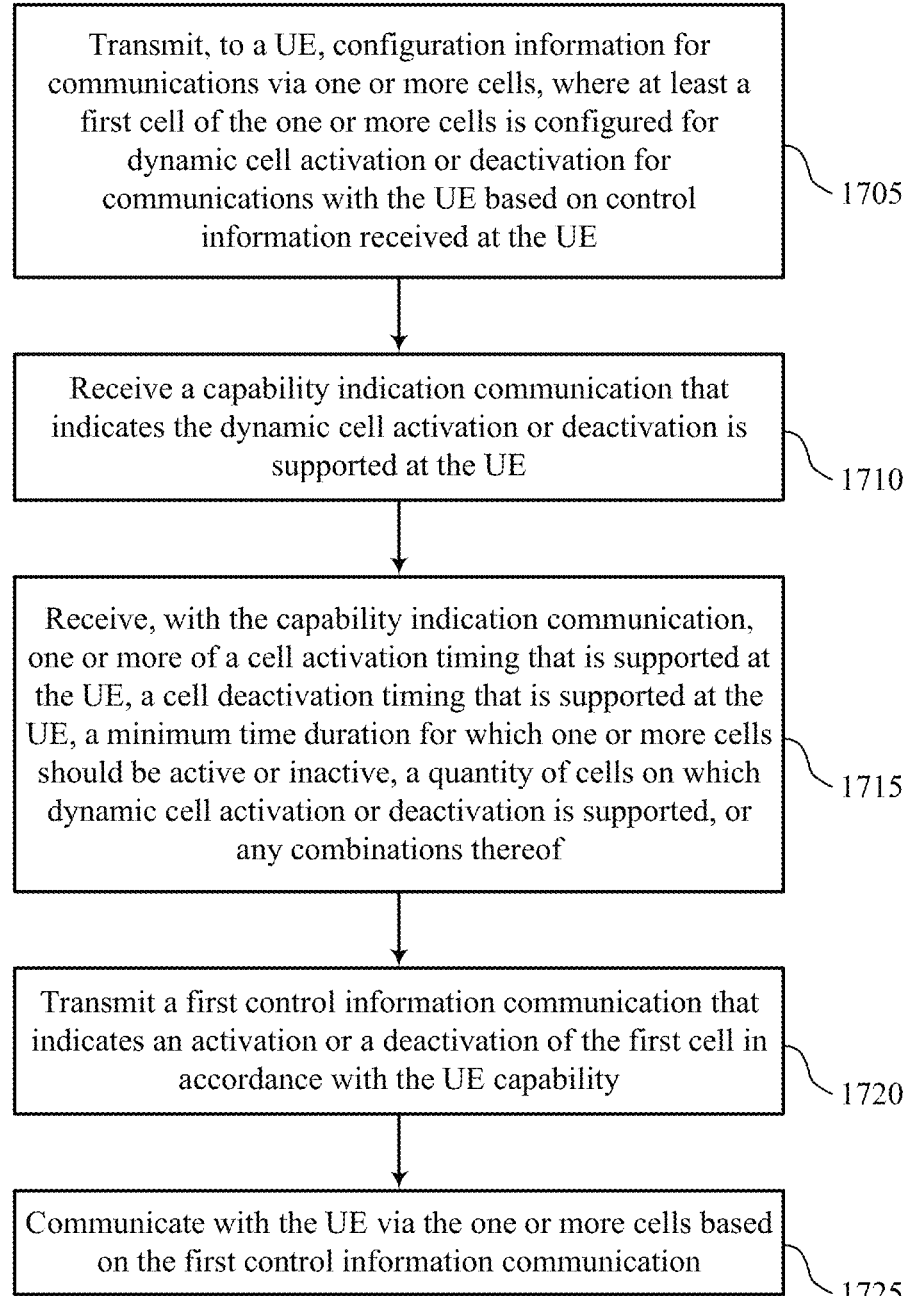

Transmit, to a UE, configuration information for communications via one or more cells, where at least a first cell of the one or more cells is configured for dynamic cell activation or deactivation for communications with the UE based on control information received at the UE

1705

Receive a capability indication communication that indicates the dynamic cell activation or deactivation is supported at the UE

1710

Receive, with the capability indication communication, one or more of a cell activation timing that is supported at the UE, a cell deactivation timing that is supported at the UE, a minimum time duration for which one or more cells should be active or inactive, a quantity of cells on which dynamic cell activation or deactivation is supported, or any combinations thereof

1715

Transmit a first control information communication that indicates an activation or a deactivation of the first cell in accordance with the UE capability

1720

Communicate with the UE via the one or more cells based on the first control information communication

TECHNIQUES FOR DYNAMIC CELL ACTIVATION AND DEACTIVATION IN WIRELESS COMMUNICATIONS

FIELD OF TECHNOLOGY

The following relates to wireless communications, including techniques for dynamic cell activation and deactivation in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for dynamic cell activation and deactivation in wireless communications. For example, the described techniques provide that a network entity may configure one or more cells for dynamic activation and deactivation, and a UE may provide information to the network entity to allow efficient scheduling and cell activation and deactivation. In some cases, a UE capability indication may be provided in which the UE may indicate a capability to support dynamic cell activation and dynamic cell deactivation (e.g., with a binary indication of UE support for dynamic cell activation or deactivation). Additionally, or alternatively, the UE may provide information such as supported switching times, supported rates of activation and deactivation, a number of cells that can be activated and deactivated, or any combinations thereof. In some cases, a UE may provide UE assistance information to the network that indicates dynamic cell activation and deactivation capabilities. For example, such assistance information may be provided in periodic reporting (e.g., that is configured by radio resource control (RRC) signaling), in aperiodic reporting that is RRC configured and activated based on a trigger from the network, in response to a network request, or any combinations thereof.

A method for wireless communication at a user equipment (UE) is described. The method may include receiving configuration information for communications via one or more cells, where at least a first cell of the one or more cells is configured for dynamic cell activation or deactivation for communications with the UE based on control information received at the UE, transmitting an indication of a UE capability associated with the dynamic cell activation or deactivation of at least the first cell, receiving a first control information communication that indicates an activation or a deactivation of the first cell in accordance with the UE capability, and communicating with a network entity via the one or more cells based on the first control information communication.

An apparatus for wireless communication at a UE is described. The apparatus may include a processor, memory coupled with the processor, and instructions stored in the memory. The instructions may be executable by the processor to cause the apparatus to receive configuration information for communications via one or more cells, where at least a first cell of the one or more cells is configured for dynamic cell activation or deactivation for communications with the UE based on control information received at the UE, transmit an indication of a UE capability associated with the dynamic cell activation or deactivation of at least the first cell, receive a first control information communication that indicates an activation or a deactivation of the first cell in accordance with the UE capability, and communicate with a network entity via the one or more cells based on the first control information communication.

Another apparatus for wireless communication at a UE is described. The apparatus may include means for receiving configuration information for communications via one or more cells, where at least a first cell of the one or more cells is configured for dynamic cell activation or deactivation for communications with the UE based on control information received at the UE, means for transmitting an indication of a UE capability associated with the dynamic cell activation or deactivation of at least the first cell, means for receiving a first control information communication that indicates an activation or a deactivation of the first cell in accordance with the UE capability, and means for communicating with a network entity via the one or more cells based on the first control information communication.

A non-transitory computer-readable medium storing code for wireless communication at a UE is described. The code may include instructions executable by a processor to receive configuration information for communications via one or more cells, where at least a first cell of the one or more cells is configured for dynamic cell activation or deactivation for communications with the UE based on control information received at the UE, transmit an indication of a UE capability associated with the dynamic cell activation or deactivation of at least the first cell, receive a first control information communication that indicates an activation or a deactivation of the first cell in accordance with the UE capability, and communicate with a network entity via the one or more cells based on the first control information communication.

In some examples of the method, apparatuses, and non-transitory computer-readable medium described herein, the transmitting the indication of the UE capability may include operations, features, means, or instructions for transmitting a capability indication communication that indicates the dynamic cell activation or deactivation is supported at the UE. In some examples of the method, apparatuses, and non-transitory computer-readable medium described herein, the transmitting the indication of the UE capability may include operations, features, means, or instructions for transmitting, with the capability indication communication, one or more of a cell activation timing that is supported at the UE, a cell deactivation timing that is supported at the UE, a minimum time duration for which one or more cells should be active or inactive, a quantity of cells on which dynamic cell activation or deactivation is supported, or any combinations thereof.

In some examples of the method, apparatuses, and non-transitory computer-readable medium described herein, the indication of the UE capability may be provided for one or more secondary cells that are configured for communication at the UE, a primary cell that is configured for communication at the UE, or any combinations thereof. In some examples of the method, apparatuses, and non-transitory computer-readable medium described herein, the transmitting the indication of the UE capability may include operations, features, means, or instructions for transmitting UE assistance information associated with dynamic cell activation or deactivation via uplink control information, via a medium access control (MAC) control element, via a physical uplink shared channel (PUSCH) payload, or any combinations thereof. In some examples of the method, apparatuses, and non-transitory computer-readable medium described herein, the UE assistance information may be transmitted based on a reporting configuration that provides for periodic or aperiodic UE capability reports, a request received from a network entity, or any combinations thereof.

In some examples of the method, apparatuses, and non-transitory computer-readable medium described herein, the UE assistance information indicates a rate at which cell activation or deactivation is supported. In some examples of the method, apparatuses, and non-transitory computer-readable medium described herein, the UE assistance information indicates one or more of a first time duration for which one or more cells are requested to stay active after activation, a second time duration for which one or more cells are requested to stay inactive after deactivation, or any combinations thereof. In some examples of the method, apparatuses, and non-transitory computer-readable medium described herein, the UE assistance information indicates one or more cell IDs for one or more cells that are requested for dynamic cell activation or deactivation. In some examples of the method, apparatuses, and non-transitory computer-readable medium described herein, the UE assistance information indicates one or more of a minimum or maximum quantity of cells on which dynamic cell activation or deactivation is requested.

In some examples of the method, apparatuses, and non-transitory computer-readable medium described herein, the first control information communication that indicates an activation or a deactivation of one or more transmission-reception points (TRPs). In some examples of the method, apparatuses, and non-transitory computer-readable medium described herein, the one or more TRPs may be identified based on a cell ID, a control resource set (CORESET) pool index, a TRP index, or any combinations thereof.

A method for wireless communication at a network entity is described. The method may include transmitting, to a UE, configuration information for communications via one or more cells, where at least a first cell of the one or more cells is configured for dynamic cell activation or deactivation for communications with the UE based on control information received at the UE, receiving, from the UE, an indication of a UE capability associated with the dynamic cell activation or deactivation of at least the first cell, transmitting a first control information communication that indicates an activation or a deactivation of the first cell in accordance with the UE capability, and communicating with the UE via the one or more cells based on the first control information communication.

An apparatus for wireless communication at a network entity is described. The apparatus may include a processor, memory coupled with the processor, and instructions stored in the memory. The instructions may be executable by the processor to cause the apparatus to transmit, to a UE, configuration information for communications via one or more cells, where at least a first cell of the one or more cells is configured for dynamic cell activation or deactivation for communications with the UE based on control information received at the UE, receive, from the UE, an indication of a UE capability associated with the dynamic cell activation or deactivation of at least the first cell, transmit a first control information communication that indicates an activation or a deactivation of the first cell in accordance with the UE capability, and communicate with the UE via the one or more cells based on the first control information communication.

Another apparatus for wireless communication at a network entity is described. The apparatus may include means for transmitting, to a UE, configuration information for communications via one or more cells, where at least a first cell of the one or more cells is configured for dynamic cell activation or deactivation for communications with the UE based on control information received at the UE, means for receiving, from the UE, an indication of a UE capability associated with the dynamic cell activation or deactivation of at least the first cell, means for transmitting a first control information communication that indicates an activation or a deactivation of the first cell in accordance with the UE capability, and means for communicating with the UE via the one or more cells based on the first control information communication.

A non-transitory computer-readable medium storing code for wireless communication at a network entity is described. The code may include instructions executable by a processor to transmit, to a UE, configuration information for communications via one or more cells, where at least a first cell of the one or more cells is configured for dynamic cell activation or deactivation for communications with the UE based on control information received at the UE, receive, from the UE, an indication of a UE capability associated with the dynamic cell activation or deactivation of at least the first cell, transmit a first control information communication that indicates an activation or a deactivation of the first cell in accordance with the UE capability, and communicate with the UE via the one or more cells based on the first control information communication.

In some examples of the method, apparatuses, and non-transitory computer-readable medium described herein, the receiving the indication of the UE capability may include operations, features, means, or instructions for receiving a capability indication communication that indicates the dynamic cell activation or deactivation is supported at the UE. In some examples of the method, apparatuses, and non-transitory computer-readable medium described herein, the receiving the indication of the UE capability may include operations, features, means, or instructions for receiving, with the capability indication communication, one or more of a cell activation timing that is supported at the UE, a cell deactivation timing that is supported at the UE, a minimum time duration for which one or more cells should be active or inactive, a quantity of cells on which dynamic cell activation or deactivation is supported, or any combinations thereof.

In some examples of the method, apparatuses, and non-transitory computer-readable medium described herein, the indication of the UE capability may be provided for one or more secondary cells that are configured for the UE, a primary cell that is configured for the UE, or any combinations thereof. In some examples of the method, apparatuses, and non-transitory computer-readable medium described herein, the receiving the indication of the UE capability may include operations, features, means, or instructions for receiving UE assistance information associated with dynamic cell activation or deactivation via uplink control information, via a MAC control element, via a PUSCH payload, or any combinations thereof.

In some examples of the method, apparatuses, and non-transitory computer-readable medium described herein, the UE assistance information may be received based on a reporting configuration that provides for periodic or aperiodic UE capability reports, a request transmitted from the network entity, or any combinations thereof. In some examples of the method, apparatuses, and non-transitory computer-readable medium described herein, the UE assistance information indicates a rate at which cell activation or deactivation is supported. In some examples of the method, apparatuses, and non-transitory computer-readable medium described herein, the UE assistance information indicates one or more of a first time duration for which one or more cells are requested to stay active after activation, a second time duration for which one or more cells are requested to stay inactive after deactivation, or any combinations thereof. In some examples of the method, apparatuses, and non-transitory computer-readable medium described herein, the UE assistance information indicates one or more cell IDs for one or more cells that are requested for dynamic cell activation or deactivation. In some examples of the method, apparatuses, and non-transitory computer-readable medium described herein, the UE assistance information indicates one or more of a minimum or maximum quantity of cells on which dynamic cell activation or deactivation is requested.

In some examples of the method, apparatuses, and non-transitory computer-readable medium described herein, the first control information communication that indicates an activation or a deactivation of one or more TRPs. In some examples of the method, apparatuses, and non-transitory computer-readable medium described herein, the one or more TRPs may be identified based on a cell ID, a CORESET pool index, a TRP index, or any combinations thereof.

BRIEF DESCRIPTION OF THE DRAWINGS

FIGS. 13 through 17 illustrate flowcharts showing methods that support techniques for dynamic cell activation and deactivation in wireless communications in accordance with one or more aspects of the present disclosure.

DETAILED DESCRIPTION

Figure 1:
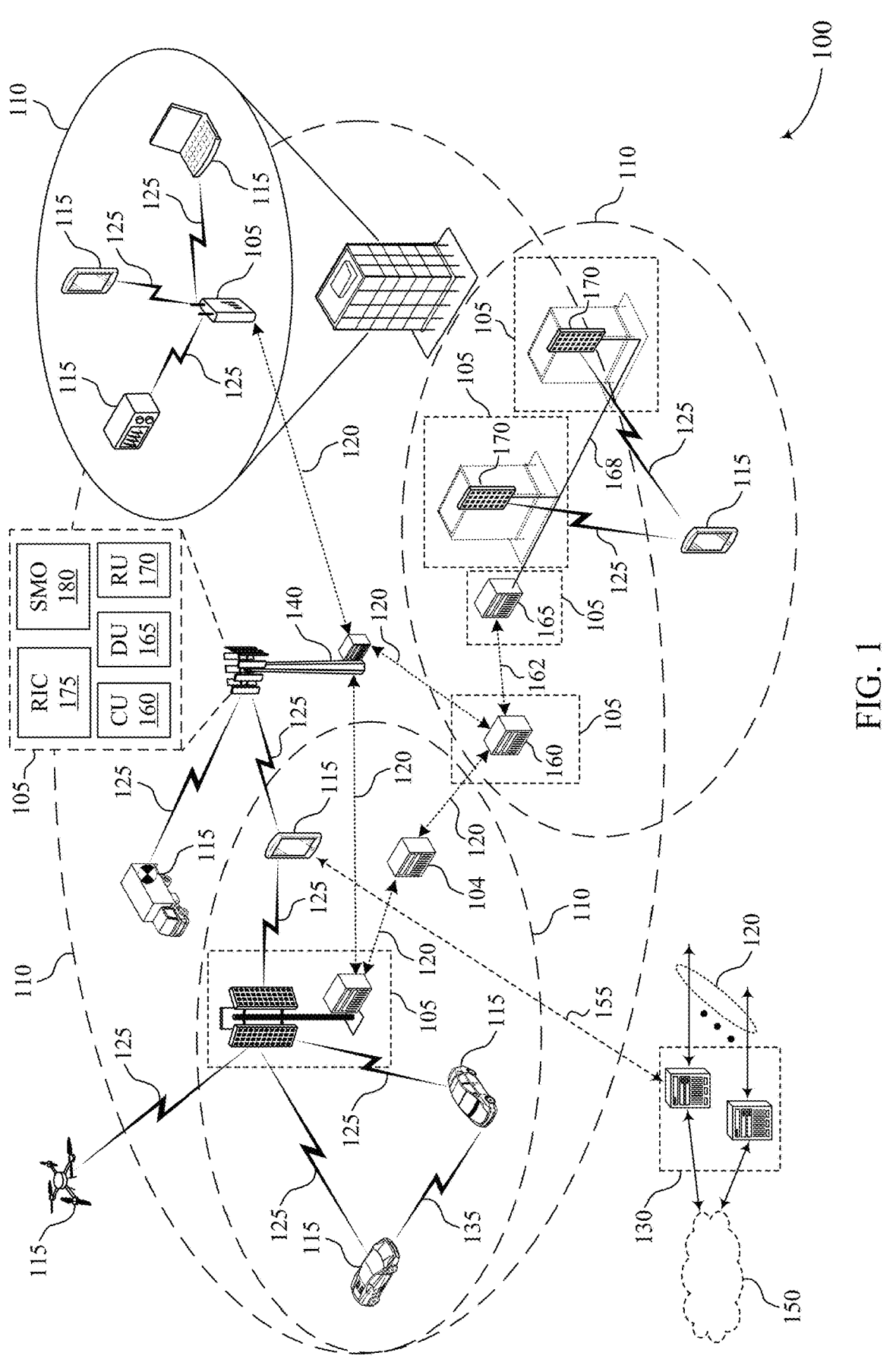
FIG. 1 illustrates an example of a wireless communications system that supports techniques for dynamic cell activation and deactivation in wireless communications in accordance with one or more aspects of the present disclosure.

A wireless communications system may include a device, such as a user equipment (UE) or a network entity (e.g., an eNodeB (eNB), a next-generation NodeB or a giga-NodeB, either of which may be referred to as a gNB, or some other base station or network entity), that supports wireless communications using one or multiple radio access technologies. Examples of radio access technologies include 4G systems, such as LTE systems, 5G systems, which may be referred to as NR systems, or other systems and radio technologies, including future systems and radio technologies not explicitly mentioned herein (e.g., sixth generation (6G) systems and beyond).

In some wireless communications systems, such as fifth generation (5G) systems, a relatively large amount of power may be consumed by network components in some situations. For example, a network entity in a system that uses beamformed communications, such as a radio unit (RU), a radio head, or a transmission-reception point (TRP), may transmit multiple directional beams in multiple directions. Such systems may provide information for use by a UE to access the wireless communications system (e.g., system information that provides parameters for system access) using beam sweeping techniques in which information is provided in multiple different transmissions in multiple different directions. For example, multiple instances of synchronization signal blocks (SSBs) and system information (SI) transmissions (e.g., remaining minimum system information (RMSI) transmissions) may be transmitted across multiple beams in multiple different directions according to a beam sweeping procedure. Such beam sweeping techniques may consume additional power relative to techniques that do not use beam sweeping (e.g., information provided in a single omni-directional transmission may consume less power than transmission of multiple instances of the information in multiple different directions). Further, such beam sweeping transmissions may be transmitted on multiple different cells, such as a primary cell (PCell) and one or more secondary cells (SCells).

In accordance with some aspects as discussed herein, in order to reduce network power consumption, a network entity may dynamically activate or deactivate one or more cells or TRPs, which may provide energy savings due to a reduced amount of transmissions when one or more cells or TRPs are deactivated. Such dynamic activation and deactivation may also allow for relatively fast adaptation of a quantity of activated or deactivated cells based on an amount of data traffic that is present for transmission. For example, during a first time period there may be no traffic or a light traffic load in one or more cells, and the network entity may deactivate the one or more cells and provide only periodic transmissions on the cell(s) (e.g., SSB and SI transmissions) while discontinuing data communications (e.g., shared channel communications) and periodic monitoring (e.g., monitoring for random access requests or small data transmission (SDT) communications) on the one or more cells. If an amount of data traffic increases such that one or more currently active cells are unable to service the data traffic within latency targets, one or more of the deactivated cells may be activated and used for data communications. In some cases, such dynamic cell activation and deactivation may be implemented on one or more SCells, which may have less control communications than a PCell and thus are more likely to have periods with light or no traffic, although such techniques may also be used in PCells in some conditions.

In accordance with various aspects discussed herein, techniques are provided in which a network may configure one or more cells for dynamic activation and deactivation, and a UE may provide information to the network to allow efficient scheduling and cell activation/deactivation. In some cases, a UE capability indication may be provided in which the UE may indicate a capability to support dynamic cell activation and dynamic cell deactivation. In some aspects, the capability indication may include a binary indication of UE support for dynamic cell activation or deactivation, or may include further information such as supported switching times, supported rates of activation or deactivation, a number of cells that can be activated or deactivated, or any combinations thereof. In some cases, a UE may provide UE assistance information to the network, such as in periodic reporting that is RRC configured, in aperiodic reporting that is RRC configured and activated based on a trigger from the network, in response to a network request, or any combinations thereof. The UE assistance information may indicate one or more of how fast the UE is able to activate/deactivate a cell (e.g., an average or maximum frequency of cell switches), a minimum time the cell should stay inactive after deactivation and a minimum time the cell should stay active after activation, which cell(s) the UE recommends and supports for dynamic activation and deactivation, a minimum or maximum number of cells the UE recommends for enabling dynamic cell activation or deactivation, or any combinations thereof. The techniques may also be applied for TRP activation/deactivation (e.g., TRP can be identified by a cell, control resource set (CORESET) pool index, or a TRP index).

Various techniques as discussed herein may provide one or more UE and network enhancements and efficiencies. For example, a network entity may transition one or more cells between an activated and deactivated state to provide for network power savings and flexibility for scheduling data traffic communications. Such techniques may provide for enhanced communications bandwidth for communications with reduced latency, and also provide for reduced power consumption, thus enhancing system efficiency and providing an enhanced user experience.

Aspects of the disclosure are initially described in the context of wireless communications systems. Aspects of the disclosure are further illustrated by and described with reference to cell activation and deactivation timings, process flows, apparatus diagrams, system diagrams, and flowcharts that relate to techniques for dynamic cell activation and deactivation in wireless communications.

FIG. 1 illustrates an example of a wireless communications system 100 that supports techniques for dynamic cell activation and deactivation in wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for dynamic cell activation and deactivation in wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some cases, a network entity 105 may configure one or more cells, one or more TRPs, or any combinations thereof, for dynamic activation and deactivation. In some aspects a UE 115 may provide information to the network entity 105 to allow efficient scheduling and cell activation and deactivation. In some cases, a UE capability indication may be provided in which the UE 115 may indicate a capability to support dynamic cell activation and dynamic cell deactivation. In some aspects, the capability indication may include a binary indication of UE 115 support for dynamic cell activation and deactivation. Additionally, or alternatively, the UE 115 may provide information such as supported switching times, supported rates of activation and deactivation, a number of cells that can be activated and deactivated, or any combinations thereof. In some cases, a UE 115 may provide UE assistance information to the network entity 105, such as in periodic reporting (e.g., that is configured by RRC signaling), in aperiodic reporting that is RRC configured and activated based on a trigger from the network, in response to a network request, or any combinations thereof.

Figure 2:
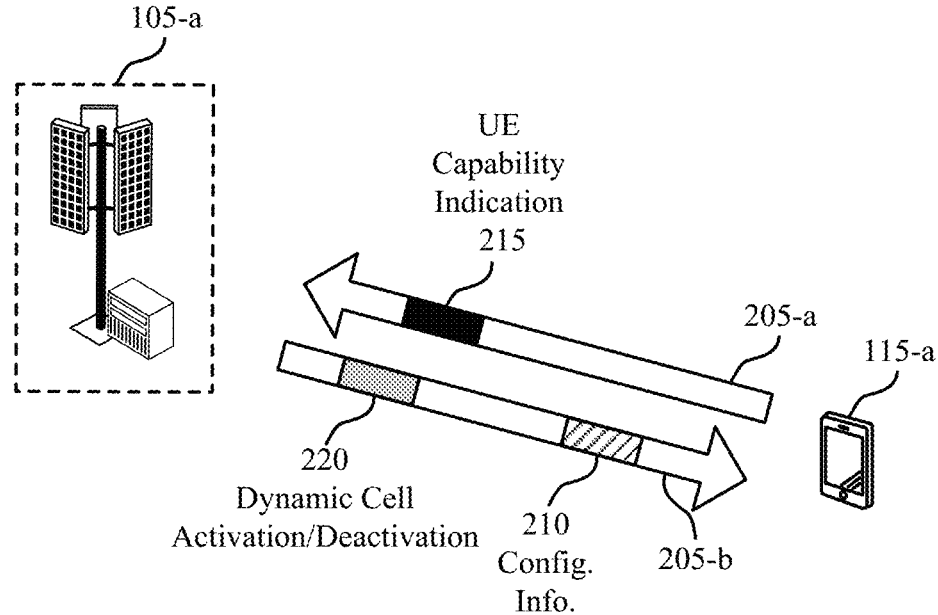
FIG. 2 illustrates an example of a wireless communications system that supports techniques for dynamic cell activation and deactivation in wireless communications in accordance with one or more aspects of the present disclosure.

FIG. 2 illustrates an example of a wireless communications system 200 that supports techniques for dynamic cell activation and deactivation in wireless communications in accordance with one or more aspects of the present disclosure. The wireless communications system 200 may implement or be implemented by aspects of the wireless communications system 100. For example, the wireless communications system 200 may include a network entity 105-a and a UE 115-a, which may be examples of a network entity 105 (e.g., an RU 170, a DU 165, a CU 160, a base station 140, or some combination thereof) and a UE 115 as described with reference to FIG. 1. The network entity 105-a and the UE 115-a may communicate with one another via an uplink channel 205-a and a downlink channel 205-b, which may be examples or components of a communication link 125 as described with reference to FIG. 1. The UE 115-a and network entity 105-a may support techniques for dynamic cell activation and deactivation. By providing dynamic cell activation and deactivation, the UE 115-a and network entity 105-a may reduce power consumption and enhance scheduling flexibility associated with concurrent communications via multiple cells, which may promote resource efficiency and reduced latency, while also providing for reduced power consumption for the wireless communications system 200.

In the example of FIG. 2, the network entity 105-a may transmit configuration information 210 to the UE 115-a. In some cases, the configuration information 210 may include information related to cell activation and deactivation. The UE 115-a may provide a UE capability indication 215 that provides information related to capabilities of the UE 115-a associated with dynamic cell activation and deactivation. In the example of FIG. 2, the network entity 105-a may transmit one or more dynamic cell activation/deactivation indications 220 that activate or deactivate one or more cells, in accordance with the UE capability indication 215.

In accordance with various aspects discussed herein, the configuration information 210 may provide information for one or more cells (e.g., a PCell and one or more SCells), and may indicate that dynamic cell activation and deactivation may be enabled for one or more cells. In some aspects, responsive to the configuration information 210, the UE 115-a may transmit the UE capability indication 215 that may include a binary indication of UE 115-*a* support for dynamic cell activation or deactivation, or may include further information such as supported switching times, supported rates of activation or deactivation, a quantity of cells that can be activated or deactivated, or any combinations thereof.

Additionally, or alternatively, the UE capability indication 215 may be provided as UE assistance information to the network entity 105-*a*, such as in periodic reporting that is RRC configured, in aperiodic reporting that is RRC configured and activated based on a trigger from the network, in response to a network request, or any combinations thereof. In some cases, the UE assistance information may indicate one or more of how fast the UE 115-*a* is able to activate a cell or deactivate a cell (e.g., an average or maximum frequency of cell switches), a minimum time the cell should stay inactive after deactivation, a minimum time the cell should stay active after activation, which cell(s) the UE 115-*a* recommends and supports for dynamic activation and deactivation, a minimum or maximum number of cells the UE recommends for enabling dynamic cell activation or deactivation, or any combinations thereof. While various examples discussed herein are directed to cell activation and deactivation, such techniques may also be applied for TRP activation/deactivation (e.g., a TRP can be identified by a cell, CORESET pool index, or a TRP index, and activated/ deactivated in accordance with techniques discussed herein).

Figure 3:
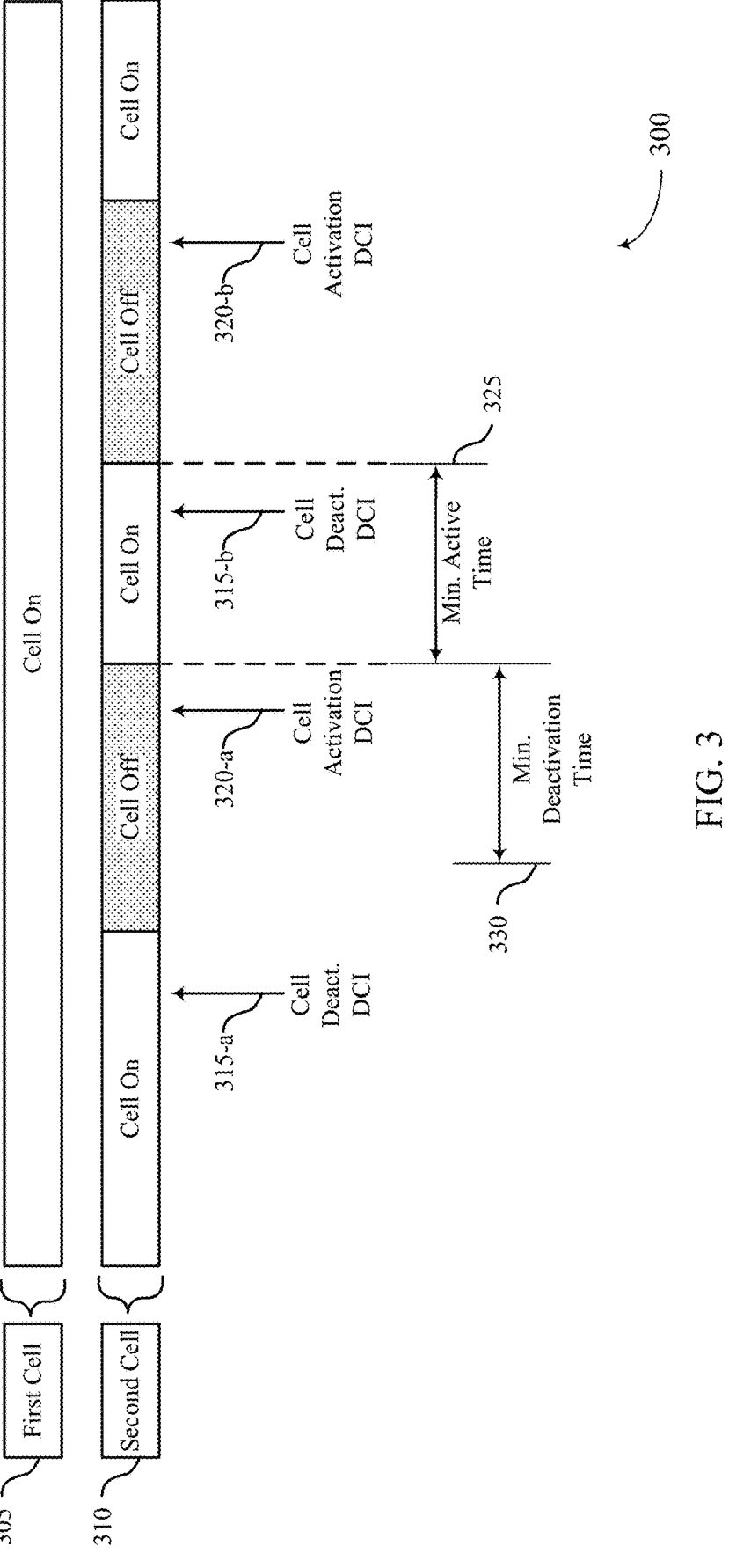
FIG. 3 illustrates an example of cell activation and deactivation timing that supports techniques for dynamic cell activation and deactivation in wireless communications in accordance with one or more aspects of the present disclosure.

FIG. 3 illustrates an example of a cell activation and deactivation timing 300 that supports techniques for dynamic cell activation and deactivation in wireless communications in accordance with one or more aspects of the present disclosure. The cell activation and deactivation timing 300 may be implemented by aspects of the wireless communications system 100 or 200. For example, one or more UEs 115 and network entities 105 of FIGS. 1 and 2, may implement the cell activation and deactivation timing 300. As discussed herein, network entity may transition one or more cells between an activated state and deactivated state, where the deactivated state has lower power consumption than the activated state. A dynamic cell activation/ deactivation configuration may be provided that indicates one or more cells may be dynamically activated or deactivated, thus allowing for reduced network power consumption and efficient scheduling to accommodate time varying traffic loads, which may enhance overall network efficiency and user experience.

In the example of FIG. 3, a network entity may configure a first cell 305 (e.g., a PCell) and a second cell 310 (e.g., a SCell), and the second cell 310 may be configured to allow for dynamic cell activation and deactivation. In this example, the first cell 305 may be configured to be always active or in a "cell on" state, and the second cell 310 may be configured for dynamic cell activation and deactivation between a cell on state and a cell off state, which may allow the network entity to dynamically activate or deactivate the second cell 310 to match a traffic load that is present for communications (e.g., based on an amount of data in a physical downlink shared channel (PDSCH) buffer at the network entity, an amount of data indicated in a buffer status report (BSR) for physical uplink shared channel (PUSCH) communications at a UE, or any combinations thereof). Thus, the network entity may activate the second cell 310 only when more bandwidth to transmit or receive communications is desirable than can be provided by the first cell 305, and otherwise the second cell 310 may be deactivated.

In some cases, dynamic activation and deactivation of the second cell 310 may be indicated using downlink control information (DCI), in which a cell deactivation DCI 315 may indicate the second cell 310 is to be deactivated, and a cell activation DCI 320 may indicate the second cell 310 is to be activated. In the example of FIG. 3, the second cell 310 may initially be activated, and the network entity may provide a cell deactivation DCI 315-*a* to deactivate the second cell 310. The network entity may identify that a traffic load has increased (e.g., based on a transmit buffer at the network entity or a BSR reported by the UE) and determine to activate the second cell 310. A cell activation DCI 320-*a* may be transmitted based on such a determination. Similarly, a subsequent cell deactivation DCI 315-*b* may be transmitted based on a reduced traffic load and a subsequent cell activation DCI 320-*b* may be transmitted based on an increased traffic load. By allowing cell activation/deactivation via DCI, cell activation may be performed dynamically to enhance reduction of energy consumption at the network side. In some cases, dynamic cell activation/ deactivation may occur per UE or for a group of UEs. Further, not every UE may support all available timelines for activation and deactivation of cells, and different UEs may have differing capabilities to support different frequencies and timelines of cell activation/deactivation. A network entity, in accordance with UE capability information as discussed herein, may allow specific UE capabilities of one or more served UEs to inform cell activation/deactivation scheduling. Such techniques may allow dynamic cell activation/deactivation decisions to be based on capabilities of currently served UEs based on UE assistance information or feedback, based on UE recommendations (e.g., that are based on UE experience, capability and internal processing knowledge), or any combinations thereof.

As discussed, in some aspects UE capability information for cell activation/deactivation may include one or more of: an indication of whether the UE does or does not support dynamic cell activation/deactivation; an indication of how fast the UE can activate or deactivate a cell (e.g., based on a number of slots or identified time period between an activation/deactivation DCI and activating or deactivating radio frequency (RF) components associated with one or more cells); an indication of a minimum active time 325 an activated cell should remain active or a minimum deactivation time 330 a deactivated cell should remain deactivated (e.g., based on power consumption associated with enabling/ disabling RF components compared with an amount of power savings associated with deactivating a cell); an indication of a maximum number of cells on which the UE can simultaneously support dynamic activation/deactivation; or any combinations thereof. In some cases, all or a portion of the UE capability information may be provided in control information communications (e.g., RRC signaling) associated with UE capabilities. Additionally, or alternatively, all or a portion of the UE capability information may be provided in UE assistance information for dynamic cell activation/deactivation. In some cases, all or a portion of assistance information may be provided in with other UE assistance information (AI) in one or more information elements or fields associated with the UE AI. In some cases, all or a portion of assistance information may be provided in a UE AI, in an uplink control information (UCI), in a payload of a PUSCH, or any combinations thereof. For example, UE assistance information may be provided: in periodic reporting that is RRC configured; in aperiodic reporting that is RRC configured and activated based on a triggering event (e.g., a DCI or medium access control (MAC) control element (CE) that triggers transmission of UE AI); based on a network request, or any combinations thereof. In some cases, the contents of this assistance information may contain one or more of the following: a rate at which the UE can activate/deactivate a cell (e.g., an average or maximum frequency of cell switches); a minimum time the cell should stay inactive, and/or a minimum time the cell should stay active; which cells the UE recommends and supports for dynamic activation and deactivation; a minimum or maximum number of cells the UE recommends enabling dynamic cell activation/deactivation; or any combinations thereof.

Figure 4:
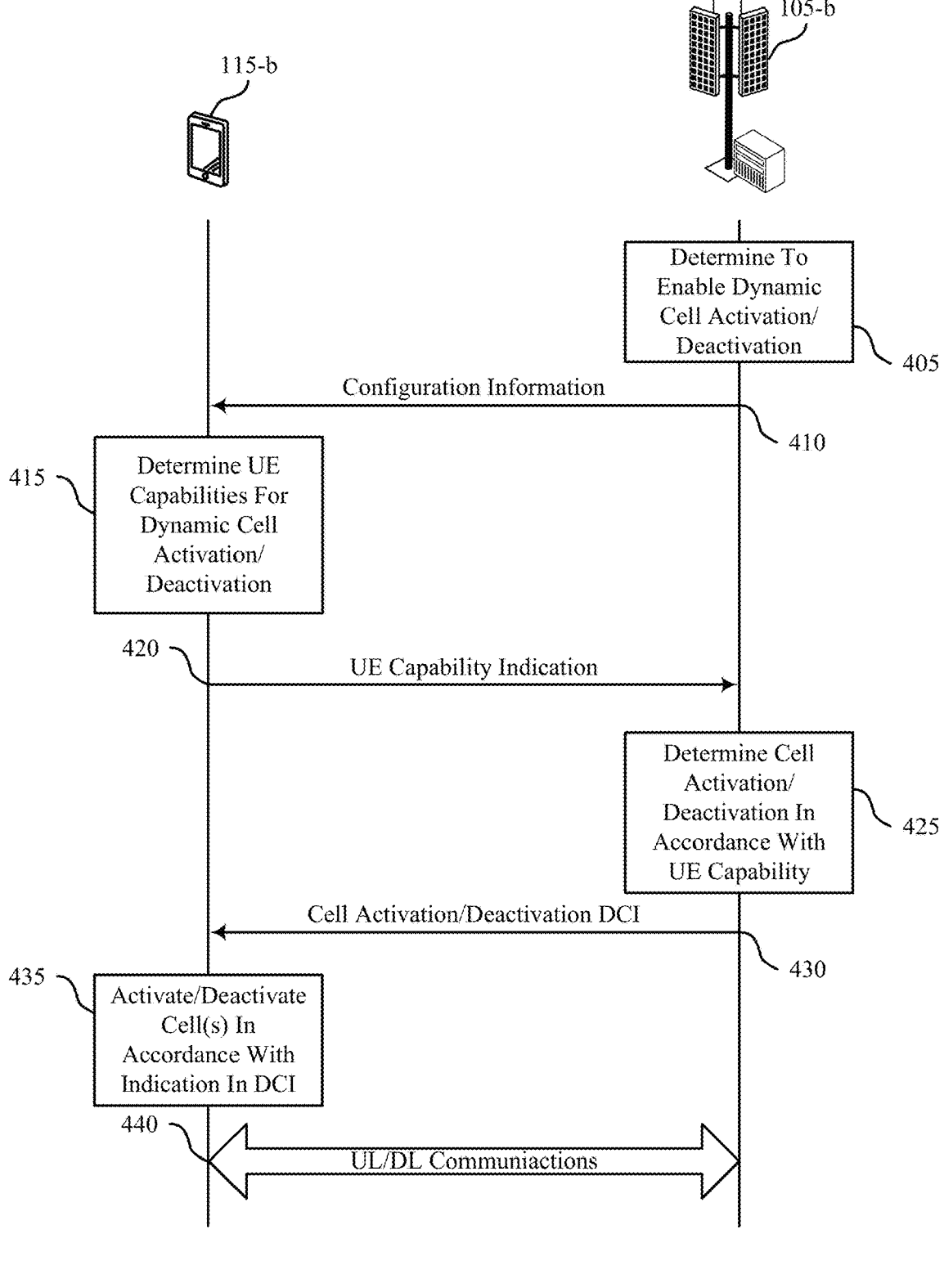
FIG. 4 illustrates an example of a process flow that supports techniques for dynamic cell activation and deactivation in wireless communications in accordance with one or more aspects of the present disclosure.

FIG. 4 illustrates an example of a process flow 400 that supports techniques for dynamic cell activation and deactivation in wireless communications in accordance with one or more aspects of the present disclosure. The process flow 400 may include a network entity 105-*b* and a UE 115-*b*, which may be examples of a network entity 105 and a UE 115 as described with reference to FIGS. 1 through 3. The process flow 400 may be implemented by the network entity 105-*b* and the UE 115-*b* where a capability indication from the UE 115-*b* provides an indication of support for dynamic cell activation and deactivation. Such techniques may provide for power savings at the network entity 105-*b* associated with an inactivation of one or more cells, while also scheduling flexibility for a communications link between the network entity 105-*b* and UE 115-*b*, which may thereby enhance overall network efficiency and user experience. In the following description of the process flow 400, the operations between the network entity 105-*b* and the UE 115-*b* may be performed in a different order than the example order shown. Some operations may be omitted from the process flow 400, and other operations may be added to the process flow 400.

At 405, the network entity 105-*b* may determine to enable dynamic cell activation and deactivation. In some cases, such a determination may be made based on an amount of data traffic that is present for communications between the UE 115-*b* and the network entity 105-*b*, a pattern of data traffic, a number of served UEs, channel conditions (e.g., whether one or more cells can support a relatively high throughput), a priority associated with data traffic (e.g., amounts of real-time or high priority traffic relative to lower priority or best-efforts traffic), or any combinations thereof.

At 410, the network entity 105-*b* may transmit, and the UE 115-*b* may receive, configuration information associated with dynamic cell activation and deactivation. As discussed herein, such configuration information may indicate that dynamic cell activation is supported for one or more cells, and that the network entity 105-*b* may schedule communications via a set of cells based on dynamic activation/ deactivation. In some cases, the configuration information may be provided via RRC signaling. In some cases, additionally, or alternatively, the configuration information may be provided with one or more system information transmissions (e.g., SIB/MIB transmissions), in one or more control channel transmissions (e.g., in DCI), and/or in one or more MAC-CE transmissions. In accordance with various aspects, the configuration information may provide trigger an aperiodic UE AI transmission, or may request UE AI.

At 415, the UE 115-*b* may determine its capabilities for dynamic cell activation and deactivation. In some cases, the capabilities of the UE 115-*b* may be based on one or more conditions at the UE 115-*b*, such as a power state (e.g., a lower power state or lower amount of available power may be associated with longer switching times or reduced frequency of supported switching), frequency bands used by the one or more cells (e.g., RF components of the UE for some frequency bands may be dynamically enabled or disabled relatively quickly, while RF components for other frequency bands are not able to be dynamically enabled or disabled quickly), one or more antenna elements or antenna panels associated with one or more cells (e.g., a PCell and SCell that share a same antenna panel or set of antenna elements may preclude the UE 115-*b* from deactivating a cell), or any combinations thereof. At 420, the UE 115-*b* may transmit a UE capability indication that may be received at the network entity 105-*b*, that indicates the UE 115-*b* capabilities for dynamic cell activation/deactivation.

At 425, the network entity 105-*b* may determine cell activation and deactivation in accordance with indicated UE 115-*b* capabilities (and optionally based on capabilities of one or more other served UEs). In some cases, the network entity 105-*b* may deactivate one or more cells to reduce an amount of communications via the deactivated cells and reduce power consumption. At 430, the network entity 105-*b* may transmit, and the UE 115-*b* may receive, a cell activation/deactivation DCI.

At 435, the UE 115-*b* may activate or deactivate one or more cells in accordance with one or more indications provided in the cell activation/deactivation DCI. At 440, the UE 115-*b* and network entity 105-*b* may exchange uplink and downlink communications via one or more activated cells in accordance with the indicated cell activation/deactivation provided in the cell activation/deactivation DCI.

Figure 5:
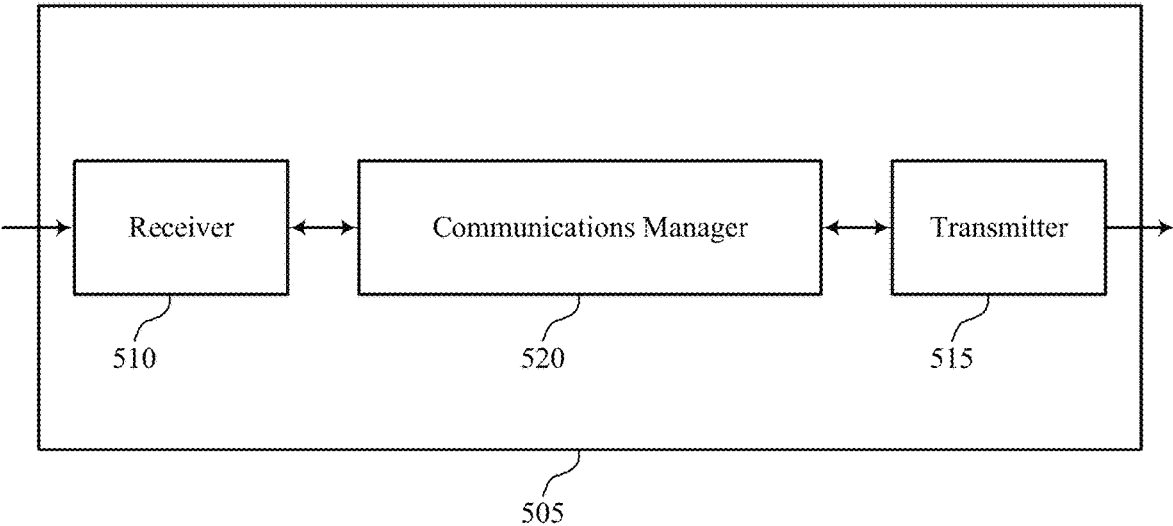
FIGS. 5 and 6 illustrate block diagrams of devices that support techniques for dynamic cell activation and deactivation in wireless communications in accordance with one or more aspects of the present disclosure.

FIG. 5 illustrates a block diagram 500 of a device 505 that supports techniques for dynamic cell activation and deactivation in wireless communications in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for dynamic cell activation and deactivation in wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for dynamic cell activation and deactivation in wireless communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for dynamic cell activation and deactivation in wireless communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving configuration information for communications via one or more cells, where at least a first cell of the one or more cells is configured for dynamic cell activation or deactivation for communications with the UE based on control information received at the UE. The communications manager 520 may be configured as or otherwise support a means for transmitting an indication of a UE capability associated with the dynamic cell activation or deactivation of at least the first cell. The communications manager 520 may be configured as or otherwise support a means for receiving a first control information communication that indicates an activation or a deactivation of the first cell in accordance with the UE capability. The communications manager 520 may be configured as or otherwise support a means for communicating with a network entity via the one or more cells based on the first control information communication.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for cell activation and deactivation based on UE capability that may be used for dynamic cell scheduling and activation based on amounts of data traffic, which may provide reduced latency, efficient adaptation of transmission parameters for communications, and enhanced system efficiency.

Figure 6:
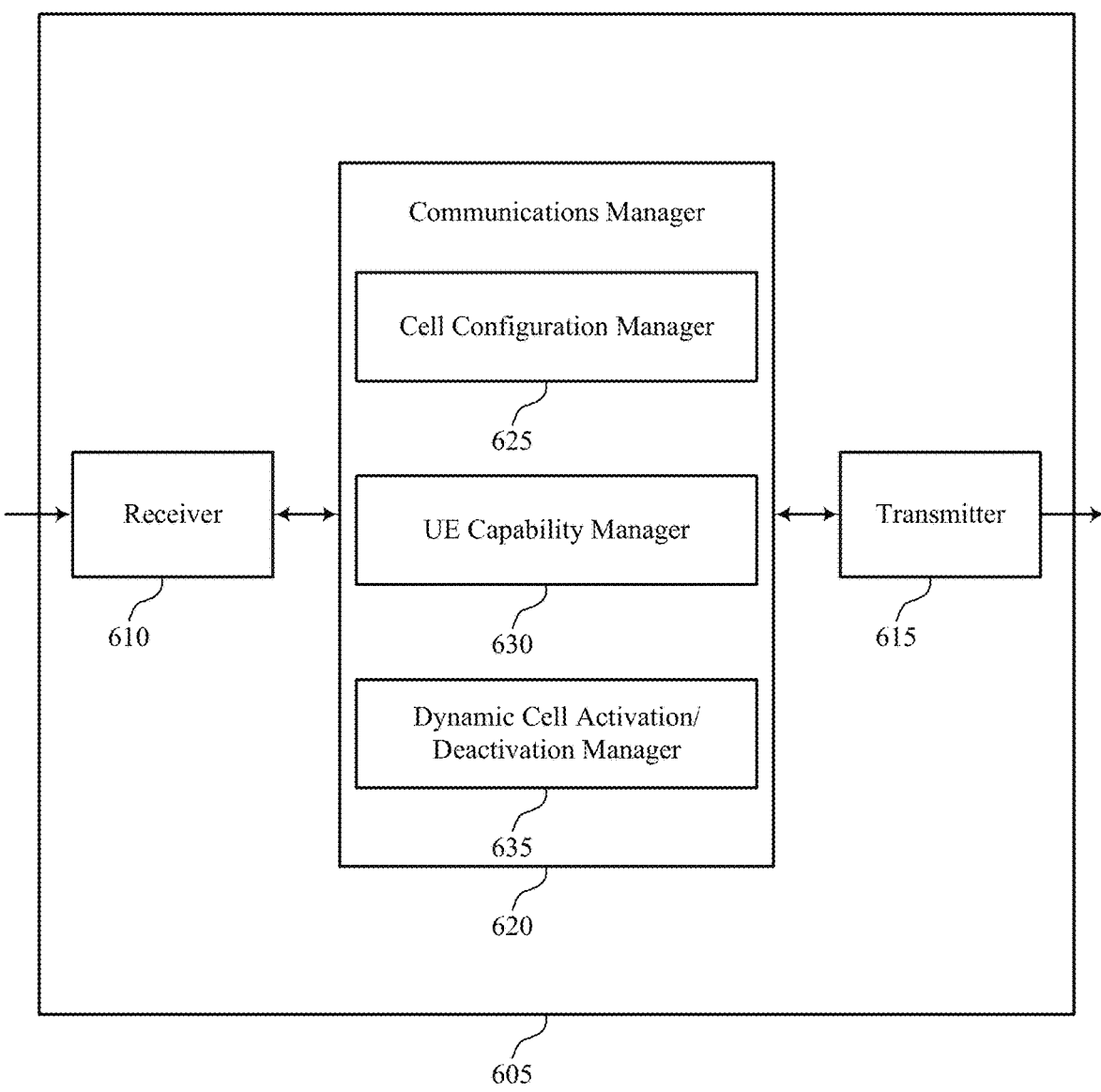

FIG. 6 illustrates a block diagram 600 of a device 605 that supports techniques for dynamic cell activation and deactivation in wireless communications in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for dynamic cell activation and deactivation in wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for dynamic cell activation and deactivation in wireless communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for dynamic cell activation and deactivation in wireless communications as described herein. For example, the communications manager 620 may include a cell configuration manager 625, a UE capability manager 630, a dynamic cell activation/deactivation manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The cell configuration manager 625 may be configured as or otherwise support a means for receiving configuration information for communications via one or more cells, where at least a first cell of the one or more cells is configured for dynamic cell activation or deactivation for communications with the UE based on control information received at the UE. The UE capability manager 630 may be configured as or otherwise support a means for transmitting an indication of a UE capability associated with the dynamic cell activation or deactivation of at least the first cell. The dynamic cell activation/deactivation manager 635 may be configured as or otherwise support a means for receiving a first control information communication that indicates an activation or a deactivation of the first cell in accordance with the UE capability. The dynamic cell activation/deactivation manager 635 may be configured as or otherwise support a means for communicating with a network entity via the one or more cells based on the first control information communication.

Figure 7:
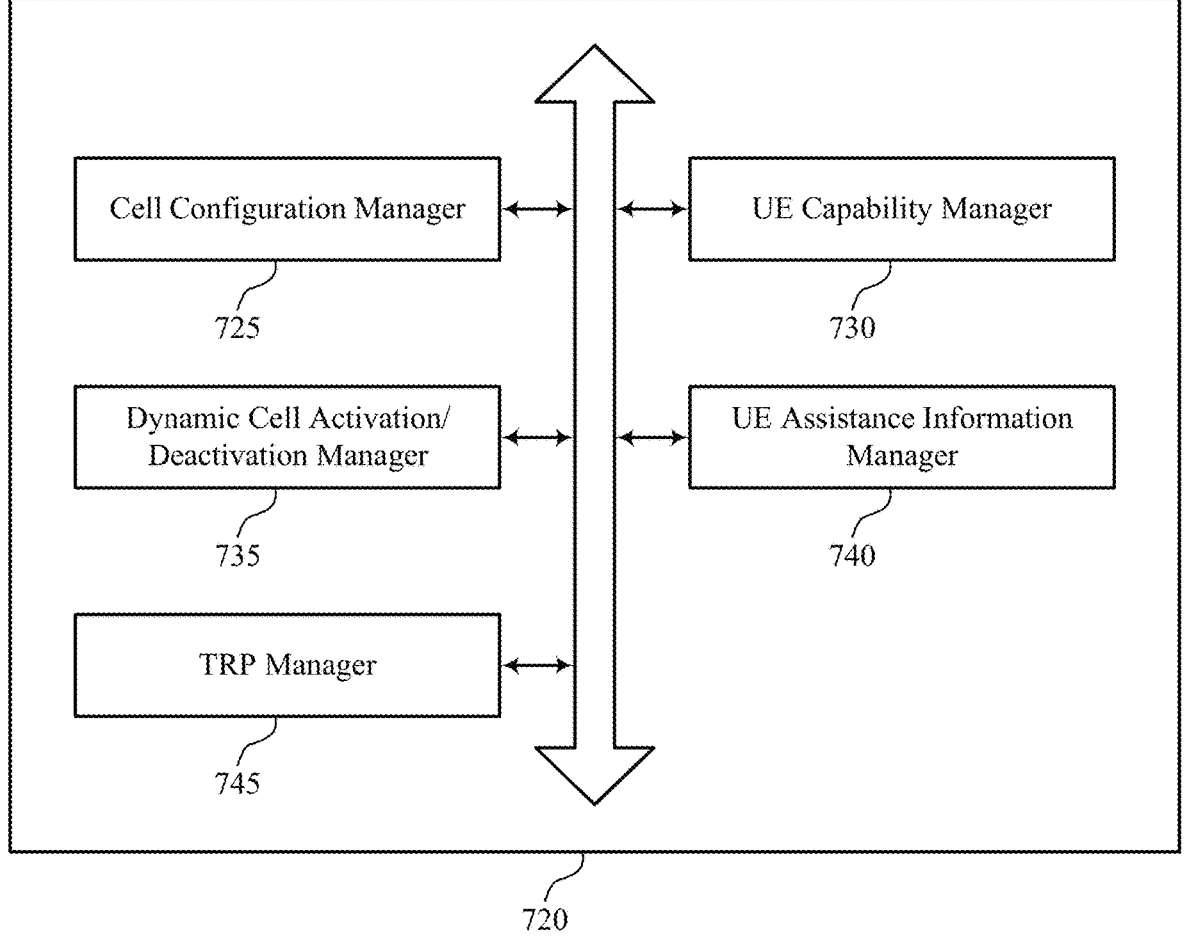
FIG. 7 illustrates a block diagram of a communications manager that supports techniques for dynamic cell activation and deactivation in wireless communications in accordance with one or more aspects of the present disclosure.

FIG. 7 illustrates a block diagram 700 of a communications manager 720 that supports techniques for dynamic cell activation and deactivation in wireless communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for dynamic cell activation and deactivation in wireless communications as described herein. For example, the communications manager 720 may include a cell configuration manager 725, a UE capability manager 730, a dynamic cell activation/deactivation manager 735, a UE assistance information manager 740, an TRP manager 745, or any combination thereof. Each of these components may communicate, directly or indirectly, with one another (e.g., via one or more buses).

The communications manager 720 may support wireless communication at a UE in accordance with examples as disclosed herein. The cell configuration manager 725 may be configured as or otherwise support a means for receiving configuration information for communications via one or more cells, where at least a first cell of the one or more cells is configured for dynamic cell activation or deactivation for communications with the UE based on control information received at the UE. The UE capability manager 730 may be configured as or otherwise support a means for transmitting an indication of a UE capability associated with the dynamic cell activation or deactivation of at least the first cell. The dynamic cell activation/deactivation manager 735 may be configured as or otherwise support a means for receiving a first control information communication that indicates an activation or a deactivation of the first cell in accordance with the UE capability. In some examples, the dynamic cell activation/deactivation manager 735 may be configured as or otherwise support a means for communicating with a network entity via the one or more cells based on the first control information communication.

In some examples, to support transmitting the indication of the UE capability, the UE capability manager 730 may be configured as or otherwise support a means for transmitting a capability indication communication that indicates the dynamic cell activation or deactivation is supported at the UE. In some examples, to support transmitting the indication of the UE capability, the UE capability manager 730 may be configured as or otherwise support a means for transmitting, with the capability indication communication, one or more of a cell activation timing that is supported at the UE, a cell deactivation timing that is supported at the UE, a minimum time duration for which one or more cells should be active or inactive, a quantity of cells on which dynamic cell activation or deactivation is supported, or any combinations thereof. In some examples, the indication of the UE capability is provided for one or more secondary cells that are configured for communication at the UE, a primary cell that is configured for communication at the UE, or any combinations thereof.

In some examples, to support transmitting the indication of the UE capability, the UE assistance information manager 740 may be configured as or otherwise support a means for transmitting UE assistance information associated with dynamic cell activation or deactivation via uplink control information, via a MAC-CE, via an PUSCH payload, or any combinations thereof.

In some examples, the UE assistance information is transmitted based on a reporting configuration that provides for periodic or aperiodic UE capability reports, a request received from a network entity, or any combinations thereof. In some examples, the UE assistance information indicates a rate at which cell activation or deactivation is supported. In some examples, the UE assistance information indicates one or more of a first time duration for which one or more cells are requested to stay active after activation, a second time duration for which one or more cells are requested to stay inactive after deactivation, or any combinations thereof. In some examples, the UE assistance information indicates one or more cell IDs for one or more cells that are requested for dynamic cell activation or deactivation. In some examples, the UE assistance information indicates one or more of a minimum or maximum quantity of cells on which dynamic cell activation or deactivation is requested. In some examples, the first control information communication that indicates an activation or a deactivation of one or more TRPs. In some examples, the one or more TRPs are identified based on a cell ID, a CORESET pool index, a TRP index, or any combinations thereof.

Figure 8:
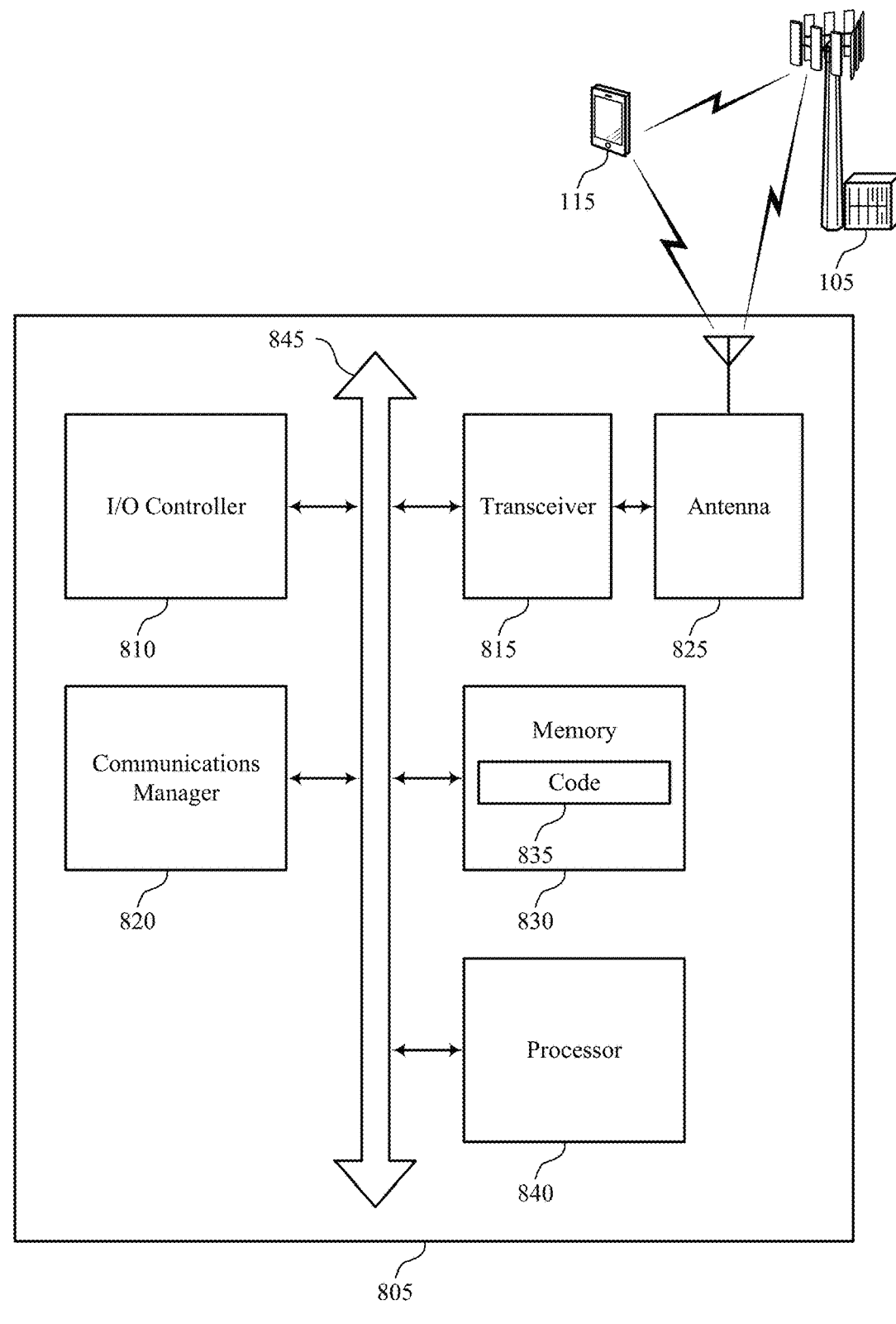
FIG. 8 illustrates a diagram of a system including a device that supports techniques for dynamic cell activation and deactivation in wireless communications in accordance with one or more aspects of the present disclosure.

FIG. 8 illustrates a diagram of a system 800 including a device 805 that supports techniques for dynamic cell activation and deactivation in wireless communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for dynamic cell activation and deactivation in wireless communications). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving configuration information for communications via one or more cells, where at least a first cell of the one or more cells is configured for dynamic cell activation or deactivation for communications with the UE based on control information received at the UE. The communications manager 820 may be configured as or otherwise support a means for transmitting an indication of a UE capability associated with the dynamic cell activation or deactivation of at least the first cell. The communications manager 820 may be configured as or otherwise support a means for receiving a first control information communication that indicates an activation or a deactivation of the first cell in accordance with the UE capability. The communications manager 820 may be configured as or otherwise support a means for communicating with a network entity via the one or more cells based on the first control information communication.

By including or configuring the communications manager 820 in accordance with examples as described herein, the device 805 may support techniques for cell activation and deactivation based on UE capability that may be used for dynamic cell scheduling and activation based on amounts of data traffic. Such techniques may provide reduced latency, efficient adaptation of transmission parameters for communications, and enhanced system efficiency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for dynamic cell activation and deactivation in wireless communications as described herein, or the processor 840 and the memory 830 may be otherwise configured to perform or support such operations.

Figure 9:
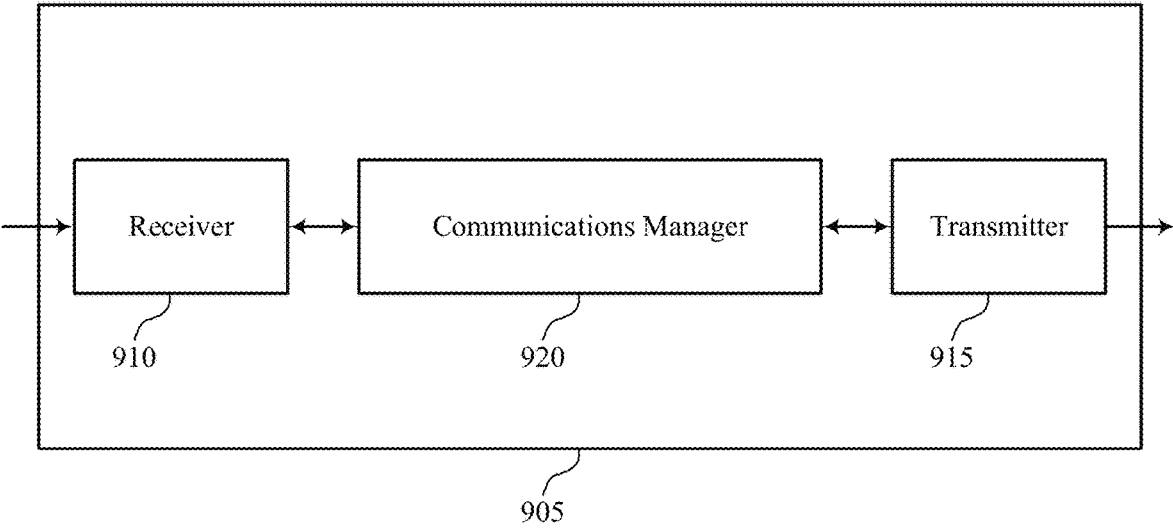
FIGS. 9 and 10 illustrate block diagrams of devices that support techniques for dynamic cell activation and deactivation in wireless communications in accordance with one or more aspects of the present disclosure.

FIG. 9 illustrates a block diagram 900 of a device 905 that supports techniques for dynamic cell activation and deactivation in wireless communications in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for dynamic cell activation and deactivation in wireless communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting, to a UE, configuration information for communications via one or more cells, where at least a first cell of the one or more cells is configured for dynamic cell activation or deactivation for communications with the UE based on control information received at the UE. The communications manager 920 may be configured as or otherwise support a means for receiving, from the UE, an indication of a UE capability associated with the dynamic cell activation or deactivation of at least the first cell. The communications manager 920 may be configured as or otherwise support a means for transmitting a first control information communication that indicates an activation or a deactivation of the first cell in accordance with the UE capability. The communications manager 920 may be configured as or otherwise support a means for communicating with the UE via the one or more cells based on the first control information communication.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for cell activation and deactivation based on UE capability that may be used for dynamic cell scheduling and activation based on amounts of data traffic. Such techniques may provide reduced latency, efficient adaptation of transmission parameters for communications, and enhanced system efficiency.

Figure 10:
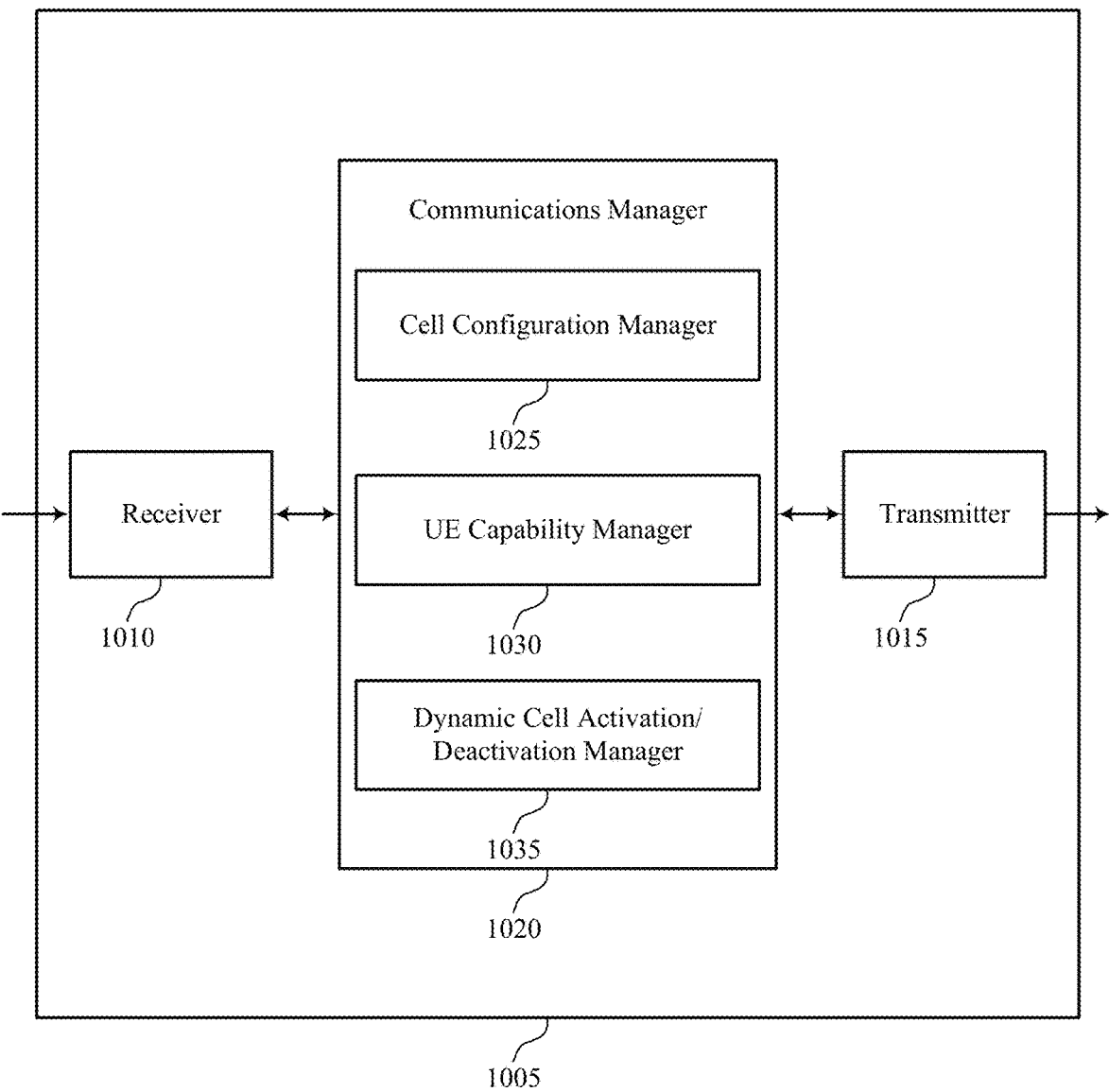

FIG. 10 illustrates a block diagram 1000 of a device 1005 that supports techniques for dynamic cell activation and deactivation in wireless communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for dynamic cell activation and deactivation in wireless communications as described herein. For example, the communications manager 1020 may include a cell configuration manager 1025, a UE capability manager 1030, a dynamic cell activation/deactivation manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The cell configuration manager 1025 may be configured as or otherwise support a means for transmitting, to a UE, configuration information for communications via one or more cells, where at least a first cell of the one or more cells is configured for dynamic cell activation or deactivation for communications with the UE based on control information received at the UE. The UE capability manager 1030 may be configured as or otherwise support a means for receiving, from the UE, an indication of a UE capability associated with the dynamic cell activation or deactivation of at least the first cell. The dynamic cell activation/deactivation manager 1035 may be configured as or otherwise support a means for transmitting a first control information communication that indicates an activation or a deactivation of the first cell in accordance with the UE capability. The dynamic cell activation/deactivation manager 1035 may be configured as or otherwise support a means for communicating with the UE via the one or more cells based on the first control information communication.

Figure 11:
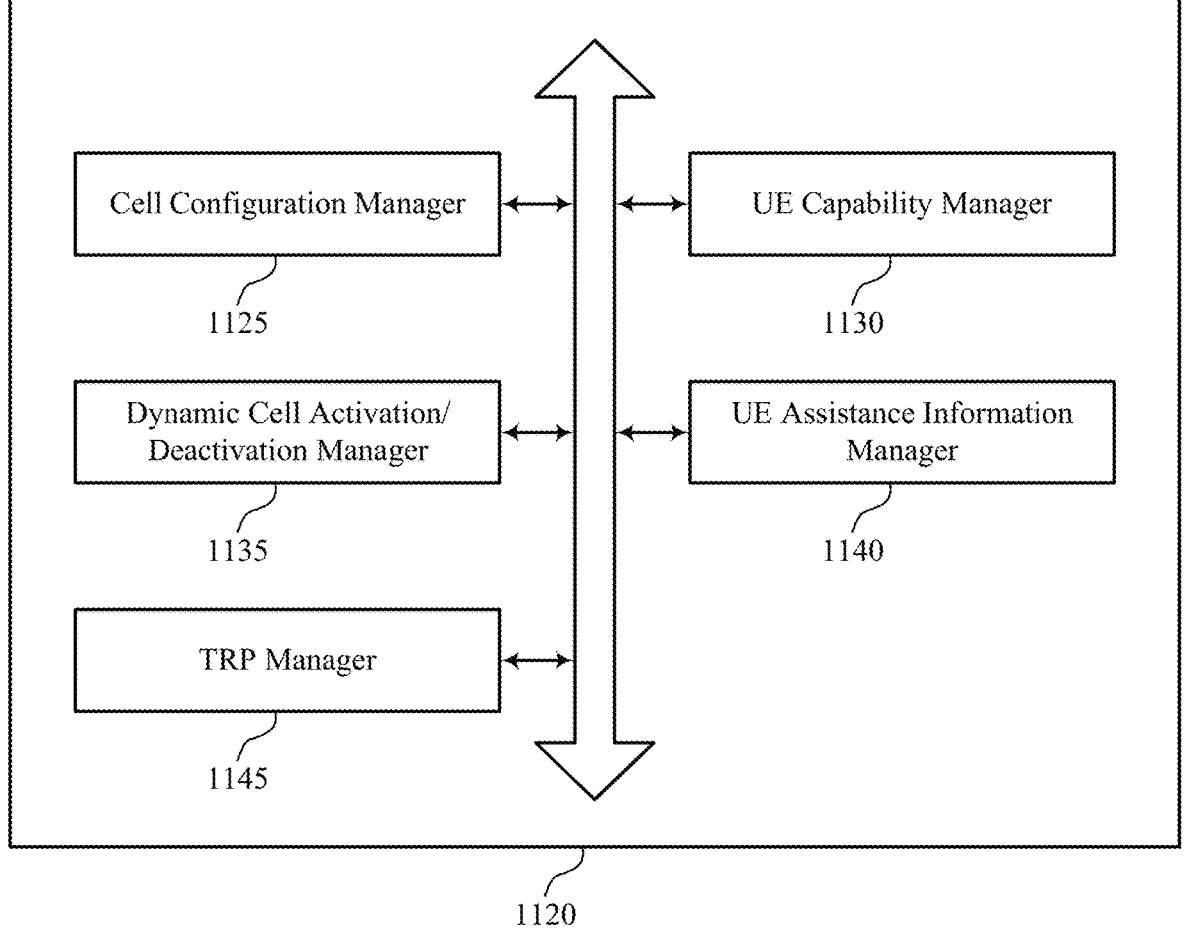
FIG. 11 illustrates a block diagram of a communications manager that supports techniques for dynamic cell activation and deactivation in wireless communications in accordance with one or more aspects of the present disclosure.

FIG. 11 illustrates a block diagram 1100 of a communications manager 1120 that supports techniques for dynamic cell activation and deactivation in wireless communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for dynamic cell activation and deactivation in wireless communications as described herein. For example, the communications manager 1120 may include a cell configuration manager 1125, a UE capability manager 1130, a dynamic cell activation/deactivation manager 1135, a UE assistance information manager 1140, an TRP manager 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The cell configuration manager 1125 may be configured as or otherwise support a means for transmitting, to a UE, configuration information for communications via one or more cells, where at least a first cell of the one or more cells is configured for dynamic cell activation or deactivation for communications with the UE based on control information received at the UE. The UE capability manager 1130 may be configured as or otherwise support a means for receiving, from the UE, an indication of a UE capability associated with the dynamic cell activation or deactivation of at least the first cell. The dynamic cell activation/deactivation manager 1135 may be configured as or otherwise support a means for transmitting a first control information communication that indicates an activation or a deactivation of the first cell in accordance with the UE capability. In some examples, the dynamic cell activation/deactivation manager 1135 may be configured as or otherwise support a means for communicating with the UE via the one or more cells based on the first control information communication.

In some examples, to support receiving the indication of the UE capability, the UE capability manager 1130 may be configured as or otherwise support a means for receiving a capability indication communication that indicates the dynamic cell activation or deactivation is supported at the UE.

In some examples, to support receiving the indication of the UE capability, the UE capability manager 1130 may be configured as or otherwise support a means for receiving, with the capability indication communication, one or more of a cell activation timing that is supported at the UE, a cell deactivation timing that is supported at the UE, a minimum time duration for which one or more cells should be active or inactive, a quantity of cells on which dynamic cell activation or deactivation is supported, or any combinations thereof. In some examples, the indication of the UE capability is provided for one or more secondary cells that are configured for the UE, a primary cell that is configured for the UE, or any combinations thereof.

In some examples, to support receiving the indication of the UE capability, the UE assistance information manager 1140 may be configured as or otherwise support a means for receiving UE assistance information associated with dynamic cell activation or deactivation via uplink control information, via a MAC-CE, via a PUSCH payload, or any combinations thereof. In some examples, the UE assistance information is received based on a reporting configuration that provides for periodic or aperiodic UE capability reports, a request transmitted from the network entity, or any combinations thereof. In some examples, the UE assistance information indicates a rate at which cell activation or deactivation is supported. In some examples, the UE assistance information indicates one or more of a first time duration for which one or more cells are requested to stay active after activation, a second time duration for which one or more cells are requested to stay inactive after deactivation, or any combinations thereof. In some examples, the UE assistance information indicates one or more cell IDs for one or more cells that are requested for dynamic cell activation or deactivation. In some examples, the UE assistance information indicates one or more of a minimum or maximum quantity of cells on which dynamic cell activation or deactivation is requested. In some examples, the first control information communication that indicates an activation or a deactivation of one or more TRPs. In some examples, the one or more TRPs are identified based on a cell ID, a CORESET pool index, a TRP index, or any combinations thereof.

Figure 12:
FIG. 12 illustrates a diagram of a system including a device that supports techniques for dynamic cell activation and deactivation in wireless communications in accordance with one or more aspects of the present disclosure.

FIG. 12 illustrates a diagram of a system 1200 including a device 1205 that supports techniques for dynamic cell activation and deactivation in wireless communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting techniques for dynamic cell activation and deactivation in wireless communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with ULEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting, to a UE, configuration information for communications via one or more cells, where at least a first cell of the one or more cells is configured for dynamic cell activation or deactivation for communications with the UE based on control information received at the UE. The communications manager 1220 may be configured as or otherwise support a means for receiving, from the UE, an indication of a UE capability associated with the dynamic cell activation or deactivation of at least the first cell. The communications manager 1220 may be configured as or otherwise support a means for transmitting a first control information communication that indicates an activation or a deactivation of the first cell in accordance with the UE capability. The communications manager 1220 may be configured as or otherwise support a means for communicating with the UE via the one or more cells based on the first control information communication.

By including or configuring the communications manager 1220 in accordance with examples as described herein, the device 1205 may support techniques for cell activation and deactivation based on UE capability that may be used for dynamic cell scheduling and activation based on amounts of data traffic. Such techniques may provide reduced latency, efficient adaptation of transmission parameters for communications, and enhanced system efficiency.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of techniques for dynamic cell activation and deactivation in wireless communications as described herein, or the processor 1235 and the memory 1225 may be otherwise configured to perform or support such operations.

FIG. 13 illustrates a flowchart showing a method 1300 that supports techniques for dynamic cell activation and deactivation in wireless communications in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving configuration information for communications via one or more cells, where at least a first cell of the one or more cells is configured for dynamic cell activation or deactivation for communications with the UE based on control information received at the UE. The operations of 1305 may be performed in accordance with examples as disclosed herein. In some examples, aspects of the operations of 1305 may be performed by a cell configuration manager 725 as described with reference to FIG. 7.

At 1310, the method may include transmitting an indication of a UE capability associated with the dynamic cell activation or deactivation of at least the first cell. The operations of 1310 may be performed in accordance with examples as disclosed herein. In some examples, aspects of the operations of 1310 may be performed by a UE capability manager 730 as described with reference to FIG. 7.

At 1315, the method may include receiving a first control information communication that indicates an activation or a deactivation of the first cell in accordance with the UE capability. The operations of 1315 may be performed in accordance with examples as disclosed herein. In some examples, aspects of the operations of 1315 may be performed by a dynamic cell activation/deactivation manager 735 as described with reference to FIG. 7.

At 1320, the method may include communicating with a network entity via the one or more cells based on the first control information communication. The operations of 1320 may be performed in accordance with examples as disclosed herein. In some examples, aspects of the operations of 1320 may be performed by a dynamic cell activation/deactivation manager 735 as described with reference to FIG. 7.

Figure 14:
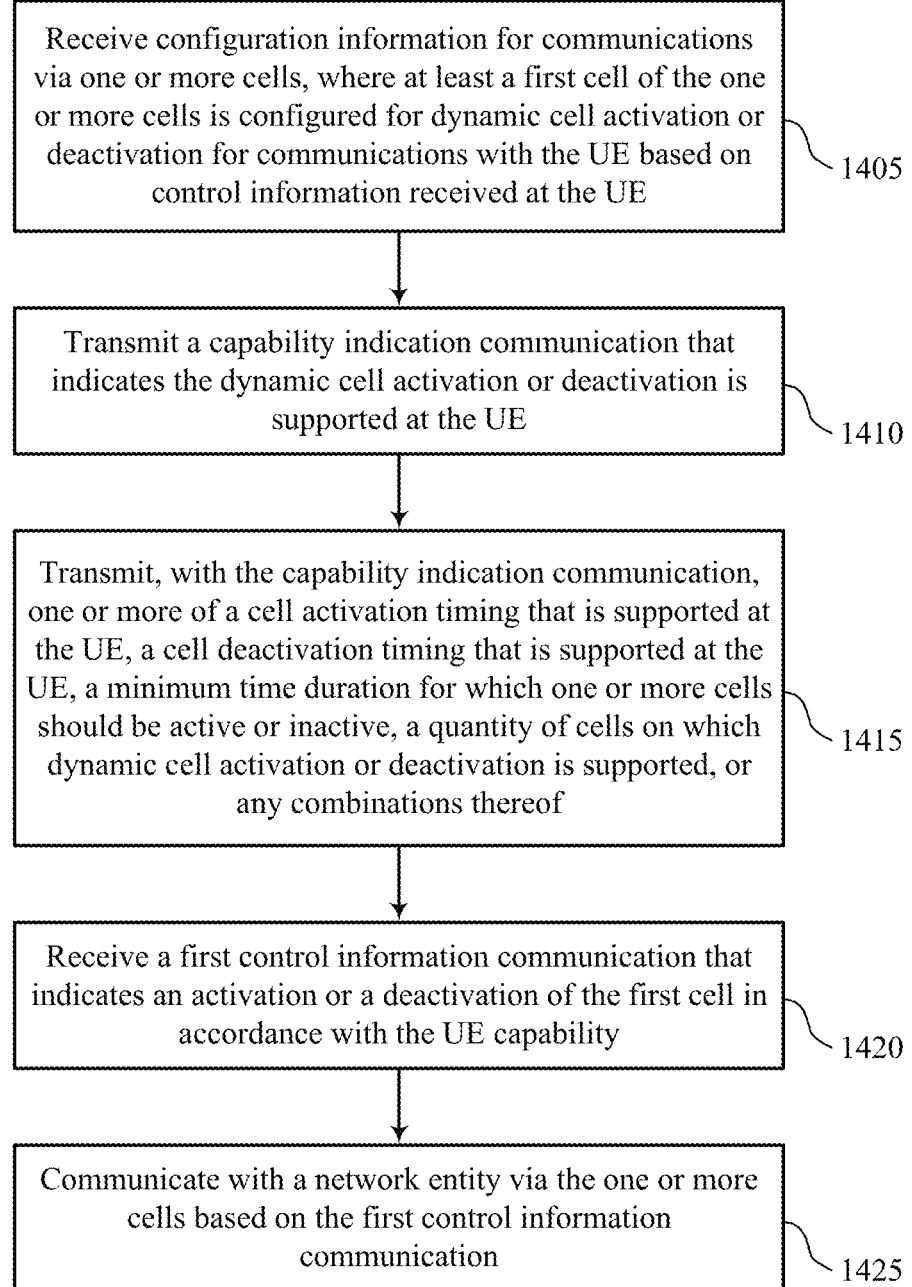

FIG. 14 illustrates a flowchart showing a method 1400 that supports techniques for dynamic cell activation and deactivation in wireless communications in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving configuration information for communications via one or more cells, where at least a first cell of the one or more cells is configured for dynamic cell activation or deactivation for communications with the UE based on control information received at the UE. The operations of 1405 may be performed in accordance with examples as disclosed herein. In some examples, aspects of the operations of 1405 may be performed by a cell configuration manager 725 as described with reference to FIG. 7.

At 1410, the method may include transmitting a capability indication communication that indicates the dynamic cell activation or deactivation is supported at the UE. The operations of 1410 may be performed in accordance with examples as disclosed herein. In some examples, aspects of the operations of 1410 may be performed by a UE capability manager 730 as described with reference to FIG. 7.

At 1415, the method may include transmitting, with the capability indication communication, one or more of a cell activation timing that is supported at the UE, a cell deactivation timing that is supported at the UE, a minimum time duration for which one or more cells should be active or inactive, a quantity of cells on which dynamic cell activation or deactivation is supported, or any combinations thereof. The operations of 1415 may be performed in accordance with examples as disclosed herein. In some examples, aspects of the operations of 1415 may be performed by a UE capability manager 730 as described with reference to FIG. 7.

At 1420, the method may include receiving a first control information communication that indicates an activation or a deactivation of the first cell in accordance with the UE capability. The operations of 1420 may be performed in accordance with examples as disclosed herein. In some examples, aspects of the operations of 1420 may be performed by a dynamic cell activation/deactivation manager 735 as described with reference to FIG. 7.

At 1425, the method may include communicating with a network entity via the one or more cells based on the first control information communication. The operations of 1425 may be performed in accordance with examples as disclosed herein. In some examples, aspects of the operations of 1425 may be performed by a dynamic cell activation/deactivation manager 735 as described with reference to FIG. 7.

FIG. 15 illustrates a flowchart showing a method 1500 that supports techniques for dynamic cell activation and deactivation in wireless communications in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving configuration information for communications via one or more cells, where at least a first cell of the one or more cells is configured for dynamic cell activation or deactivation for communications with the UE based on control information received at the UE. The operations of 1505 may be performed in accordance with examples as disclosed herein. In some examples, aspects of the operations of 1505 may be performed by a cell configuration manager 725 as described with reference to FIG. 7.

At 1510, the method may include transmitting an indication of a UE capability associated with the dynamic cell activation or deactivation of at least the first cell. The operations of 1510 may be performed in accordance with examples as disclosed herein. In some examples, aspects of the operations of 1510 may be performed by a UE capability manager 730 as described with reference to FIG. 7.

At 1515, the method may include transmitting UE assistance information associated with dynamic cell activation or deactivation via uplink control information, via a MAC control element, via a PUSCH payload, or any combinations thereof. The operations of 1515 may be performed in accordance with examples as disclosed herein. In some examples, aspects of the operations of 1515 may be performed by a UE assistance information manager 740 as described with reference to FIG. 7.

At 1520, the method may include receiving a first control information communication that indicates an activation or a deactivation of the first cell in accordance with the UE capability. The operations of 1520 may be performed in accordance with examples as disclosed herein. In some examples, aspects of the operations of 1520 may be performed by a dynamic cell activation/deactivation manager 735 as described with reference to FIG. 7.

At 1525, the method may include communicating with a network entity via the one or more cells based on the first control information communication. The operations of 1525 may be performed in accordance with examples as disclosed herein. In some examples, aspects of the operations of 1525 may be performed by a dynamic cell activation/deactivation manager 735 as described with reference to FIG. 7.

FIG. 16 illustrates a flowchart showing a method 1600 that supports techniques for dynamic cell activation and deactivation in wireless communications in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, configuration information for communications via one or more cells, where at least a first cell of the one or more cells is configured for dynamic cell activation or deactivation for communications with the UE based on control information received at the UE. The operations of 1605 may be performed in accordance with examples as disclosed herein. In some examples, aspects of the operations of 1605 may be performed by a cell configuration manager 1125 as described with reference to FIG. 11.

At 1610, the method may include receiving, from the UE, an indication of a UE capability associated with the dynamic cell activation or deactivation of at least the first cell. The operations of 1610 may be performed in accordance with examples as disclosed herein. In some examples, aspects of the operations of 1610 may be performed by a UE capability manager 1130 as described with reference to FIG. 11.

At 1615, the method may include transmitting a first control information communication that indicates an activation or a deactivation of the first cell in accordance with the UE capability. The operations of 1615 may be performed in accordance with examples as disclosed herein. In some examples, aspects of the operations of 1615 may be performed by a dynamic cell activation/deactivation manager 1135 as described with reference to FIG. 11.

At 1620, the method may include communicating with the UE via the one or more cells based on the first control information communication. The operations of 1620 may be performed in accordance with examples as disclosed herein. In some examples, aspects of the operations of 1620 may be performed by a dynamic cell activation/deactivation manager 1135 as described with reference to FIG. 11.

FIG. 17 illustrates a flowchart showing a method 1700 that supports techniques for dynamic cell activation and deactivation in wireless communications in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, configuration information for communications via one or more cells, where at least a first cell of the one or more cells is configured for dynamic cell activation or deactivation for communications with the UE based on control information received at the UE. The operations of 1705 may be performed in accordance with examples as disclosed herein. In some examples, aspects of the operations of 1705 may be performed by a cell configuration manager 1125 as described with reference to FIG. 11.

At 1710, the method may include receiving a capability indication communication that indicates the dynamic cell activation or deactivation is supported at the UE. The operations of 1710 may be performed in accordance with examples as disclosed herein. In some examples, aspects of the operations of 1710 may be performed by a UE capability manager 1130 as described with reference to FIG. 11.

At 1715, the method may include receiving, with the capability indication communication, one or more of a cell activation timing that is supported at the UE, a cell deactivation timing that is supported at the UE, a minimum time duration for which one or more cells should be active or inactive, a quantity of cells on which dynamic cell activation or deactivation is supported, or any combinations thereof. The operations of 1715 may be performed in accordance with examples as disclosed herein. In some examples, aspects of the operations of 1715 may be performed by a UE capability manager 1130 as described with reference to FIG. 11.

At 1720, the method may include transmitting a first control information communication that indicates an activation or a deactivation of the first cell in accordance with the UE capability. The operations of 1720 may be performed in accordance with examples as disclosed herein. In some examples, aspects of the operations of 1720 may be performed by a dynamic cell activation/deactivation manager 1135 as described with reference to FIG. 11.

At 1725, the method may include communicating with the UE via the one or more cells based on the first control information communication. The operations of 1725 may be performed in accordance with examples as disclosed herein. In some examples, aspects of the operations of 1725 may be performed by a dynamic cell activation/deactivation manager 1135 as described with reference to FIG. 11.

The following provides an overview of aspects of the present disclosure:

Aspect 1: A method for wireless communication at a UE, comprising: receiving configuration information for communications via one or more cells, wherein at least a first cell of the one or more cells is configured for dynamic cell activation or deactivation for communications with the UE based at least in part on control information received at the UE; transmitting an indication of a UE capability associated with the dynamic cell activation or deactivation of at least the first cell; receiving a first control information communication that indicates an activation or a deactivation of the first cell in accordance with the UE capability; and communicating with a network entity via the one or more cells based at least in part on the first control information communication.

Aspect 2: The method of aspect 1, wherein the transmitting the indication of the UE capability comprises: transmitting a capability indication communication that indicates the dynamic cell activation or deactivation is supported at the UE.

Aspect 3: The method of aspect 2, wherein the transmitting the indication of the UE capability further comprises: transmitting, with the capability indication communication, one or more of a cell activation timing that is supported at the UE, a cell deactivation timing that is supported at the UE, a minimum time duration for which one or more cells should be active or inactive, a quantity of cells on which dynamic cell activation or deactivation is supported, or any combinations thereof.

Aspect 4: The method of any of aspects 1 through 3, wherein the indication of the UE capability is provided for one or more secondary cells that are configured for communication at the UE, a primary cell that is configured for communication at the UE, or any combinations thereof.

Aspect 5: The method of any of aspects 1 through 4, wherein the transmitting the indication of the UE capability comprises: transmitting UE assistance information associated with dynamic cell activation or deactivation via uplink control information, via a medium access control (MAC) control element, via an PUSCH payload, or any combinations thereof.

Aspect 6: The method of aspect 5, wherein the UE assistance information is transmitted based at least in part on a reporting configuration that provides for periodic or aperiodic UE capability reports, a request received from a network entity, or any combinations thereof.

Aspect 7: The method of any of aspects 5 through 6, wherein the UE assistance information indicates a rate at which cell activation or deactivation is supported.

Aspect 8: The method of any of aspects 5 through 7, wherein the UE assistance information indicates one or more of a first time duration for which one or more cells are requested to stay active after activation, a second time duration for which one or more cells are requested to stay inactive after deactivation, or any combinations thereof.

Aspect 9: The method of any of aspects 5 through 8, wherein the UE assistance information indicates one or more cell IDs for one or more cells that are requested for dynamic cell activation or deactivation.

Aspect 10: The method of any of aspects 5 through 9, wherein the UE assistance information indicates one or more of a minimum or maximum quantity of cells on which dynamic cell activation or deactivation is requested.

Aspect 11: The method of any of aspects 1 through 10, wherein the first control information communication that indicates an activation or a deactivation of one or more transmission-reception points (TRPs).

Aspect 12: The method of aspect 11, wherein the one or more TRPs are identified based at least in part on a cell ID, a control resource set (CORESET) pool index, a TRP index, or any combinations thereof.

Aspect 13: A method for wireless communication at a network entity, comprising: transmitting, to a UE, configuration information for communications via one or more cells, wherein at least a first cell of the one or more cells is configured for dynamic cell activation or deactivation for communications with the UE based at least in part on control information received at the UE; receiving, from the UE, an indication of a UE capability associated with the dynamic cell activation or deactivation of at least the first cell; transmitting a first control information communication that indicates an activation or a deactivation of the first cell in accordance with the UE capability; and communicating with the UE via the one or more cells based at least in part on the first control information communication.

Aspect 14: The method of aspect 13, wherein the receiving the indication of the UE capability comprises: receiving a capability indication communication that indicates the dynamic cell activation or deactivation is supported at the UE.

Aspect 15: The method of aspect 14, wherein the receiving the indication of the UE capability further comprises: receiving, with the capability indication communication, one or more of a cell activation timing that is supported at the UE, a cell deactivation timing that is supported at the UE, a minimum time duration for which one or more cells should be active or inactive, a quantity of cells on which dynamic cell activation or deactivation is supported, or any combinations thereof.

Aspect 16: The method of any of aspects 13 through 15, wherein the indication of the UE capability is provided for one or more secondary cells that are configured for the UE, a primary cell that is configured for the UE, or any combinations thereof.

Aspect 17: The method of any of aspects 13 through 16, wherein the receiving the indication of the UE capability comprises: receiving UE assistance information associated with dynamic cell activation or deactivation via uplink control information, via a medium access control (MAC) control element, via an PUSCH payload, or any combinations thereof.

Aspect 18: The method of aspect 17, wherein the UE assistance information is received based at least in part on a reporting configuration that provides for periodic or aperiodic UE capability reports, a request transmitted from the network entity, or any combinations thereof.

Aspect 19: The method of any of aspects 17 through 18, wherein the UE assistance information indicates a rate at which cell activation or deactivation is supported.

Aspect 20: The method of any of aspects 17 through 19, wherein the UE assistance information indicates one or more of a first time duration for which one or more cells are requested to stay active after activation, a second time duration for which one or more cells are requested to stay inactive after deactivation, or any combinations thereof.

Aspect 21: The method of any of aspects 17 through 20, wherein the UE assistance information indicates one or more cell IDs for one or more cells that are requested for dynamic cell activation or deactivation.

Aspect 22: The method of any of aspects 17 through 21, wherein the UE assistance information indicates one or more of a minimum or maximum quantity of cells on which dynamic cell activation or deactivation is requested.

Aspect 23: The method of any of aspects 13 through 22, wherein the first control information communication that indicates an activation or a deactivation of one or more transmission-reception points (TRPs).

Aspect 24: The method of aspect 23, wherein the one or more TRPs are identified based at least in part on a cell ID, a control resource set (CORESET) pool index, a TRP index, or any combinations thereof.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a network entity, comprising a processor; memory coupled with the processor; and instructions stored in the memory and executable by the processor to cause the apparatus to perform a method of any of aspects 13 through 24.

Aspect 29: An apparatus for wireless communication at a network entity, comprising at least one means for performing a method of any of aspects 13 through 24.

Aspect 30: A non-transitory computer-readable medium storing code for wireless communication at a network entity, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving configuration information for communications via a set of multiple cells, wherein at least a first cell of the set of multiple cells is configured for dynamic cell activation or deactivation for communications with the UE based at least in part on control information received at the UE;

transmitting, via a UE assistance information message, an indication of a UE capability associated with the dynamic cell activation or deactivation of at least the first cell and an indication of one or more cell IDs for one or more cells that are requested for dynamic cell activation or deactivation;

receiving a downlink control information communication that indicates for the UE to perform an activation or a deactivation of the first cell in accordance with the UE capability and in accordance with the one or more cell IDs requested for dynamic cell activation or deactivation indicated via the UE assistance information message including an ID of the first cell; and communicating with a network entity via the set of multiple cells based at least in part on the dynamic cell activation or deactivation indicated by the downlink control information communication.

2. The method of claim 1, wherein the transmitting the indication of the UE capability comprises:

transmitting a capability indication communication that indicates the dynamic cell activation or deactivation is supported at the UE.

3. The method of claim 2, wherein the transmitting the indication of the UE capability further comprises:

transmitting, with the capability indication communication, one or more of a cell activation timing that is supported at the UE, a cell deactivation timing that is supported at the UE, a minimum time duration for which one or more cells should be active or inactive, a quantity of cells on which dynamic cell activation or deactivation is supported, or any combinations thereof.

4. The method of claim 1, wherein the indication of the UE capability is provided for one or more secondary cells that are configured for communication at the UE, a primary cell that is configured for communication at the UE, or any combinations thereof.

5. The method of claim 1, wherein the transmitting the indication of the UE capability via the UE assistance information message comprises:

transmitting the UE assistance information message associated with dynamic cell activation or deactivation via uplink control information via a medium access control (MAC) control element, via a physical uplink shared channel (PUSCH) payload, or via both.

6. The method of claim 1, wherein the UE assistance information message is transmitted based at least in part on a reporting configuration that provides for periodic or aperiodic UE capability reports, a request received from a network entity, or any combinations thereof.

7. The method of claim 1, wherein the UE assistance information message indicates a rate at which cell activation or deactivation is supported by the UE.

8. The method of claim 1, wherein the UE assistance information message indicates one or more of a first time duration for which one or more cells are requested to stay active after activation, a second time duration for which one or more cells are requested to stay inactive after deactivation, or any combinations thereof.

9. The method of claim 1, wherein the UE assistance information message indicates one or more of a minimum or maximum quantity of cells on which dynamic cell activation or deactivation is requested.

10. The method of claim 1, wherein the downlink control information communication indicates for the UE to perform an activation or a deactivation of one or more transmission-reception points (TRPs).

11. The method of claim 10, wherein the one or more TRPs are identified based at least in part on a cell ID, a control resource set (CORESET) pool index, a TRP index, or any combinations thereof.

12. A method for wireless communication at a network entity, comprising:

transmitting, to a user equipment (UE), configuration information for communications via a set of multiple cells, wherein at least a first cell of the set of multiple cells is configured for dynamic cell activation or deactivation for communications with the UE based at least in part on control information received at the UE;

receiving, from the UE via a UE assistance information message, an indication of a UE capability associated with the dynamic cell activation or deactivation of at least the first cell and an indication of one or more cell IDs for one or more cells that are requested for dynamic cell activation or deactivation;

transmitting a downlink control information communication that indicates for the UE to perform an activation or a deactivation of the first cell in accordance with the UE capability and in accordance with the one or more cell IDs requested for dynamic cell activation or deactivation indicated via the UE assistance information message including an ID of the first cell; and communicating with the UE via the set of multiple cells based at least in part on the dynamic cell activation or deactivation indicated by the downlink control information communication.

13. The method of claim 12, wherein the receiving the indication of the UE capability comprises:

receiving a capability indication communication that indicates the dynamic cell activation or deactivation is supported at the UE.

14. The method of claim 13, wherein the receiving the indication of the UE capability further comprises:

receiving, with the capability indication communication, one or more of a cell activation timing that is supported at the UE, a cell deactivation timing that is supported at the UE, a minimum time duration for which one or more cells should be active or inactive, a quantity of cells on which dynamic cell activation or deactivation is supported, or any combinations thereof.

15. The method of claim 12, wherein the indication of the UE capability is provided for one or more secondary cells that are configured for the UE, a primary cell that is configured for the UE, or any combinations thereof.

16. The method of claim 12, wherein the receiving the indication of the UE capability via the UE assistance information message comprises:

receiving the UE assistance information message associated with dynamic cell activation or deactivation via uplink control information via a medium access control (MAC) control element, via a physical uplink shared channel (PUSCH) payload, or via both.

17. The method of claim 12, wherein the UE assistance information message is received based at least in part on a reporting configuration that provides for periodic or aperiodic UE capability reports, a request transmitted from the network entity, or any combinations thereof.

18. The method of claim 12, wherein the UE assistance information message indicates a rate at which cell activation or deactivation is supported by the UE.

19. The method of claim 12, wherein the UE assistance information message indicates one or more of a first time duration for which one or more cells are requested to stay active after activation, a second time duration for which one or more cells are requested to stay inactive after deactivation, or any combinations thereof.

20. The method of claim 12, wherein the UE assistance information message indicates one or more of a minimum or maximum quantity of cells on which dynamic cell activation or deactivation is requested.

21. The method of claim 12, wherein the downlink control information communication indicates for the UE to perform an activation or a deactivation of one or more transmission-reception points (TRPs).

22. The method of claim 21, wherein the one or more TRPs are identified based at least in part on a cell ID, a control resource set (CORESET) pool index, a TRP index, or any combinations thereof.

23. An apparatus for wireless communication at a user equipment (UE), comprising:

a processor;

memory coupled with the processor; and instructions stored in the memory and executable by the processor to cause the apparatus to:

receive configuration information for communications via a set of multiple cells, wherein at least a first cell of the set of multiple cells is configured for dynamic cell activation or deactivation for communications with the UE based at least in part on control information received at the UE;

transmit, via a UE assistance information message, an indication of a UE capability associated with the dynamic cell activation or deactivation of at least the first cell and an indication of one or more cell IDs for one or more cells that are requested for dynamic cell activation or deactivation;

receive a downlink control information communication that indicates for the UE to perform an activation or a deactivation of the first cell in accordance with the UE capability and in accordance with the one or more cell IDs requested for dynamic cell activation or deactivation indicated via the UE assistance information message including an ID of the first cell; and communicate with a network entity via the set of multiple cells based at least in part on the dynamic cell activation or deactivation indicated by the downlink control information communication.

24. The apparatus of claim 23, wherein the instructions to transmit the indication of the UE capability are executable by the processor to cause the apparatus to:

transmit a capability indication communication that indicates the dynamic cell activation or deactivation is supported at the UE; and transmit, with the capability indication communication, one or more of a cell activation timing that is supported at the UE, a cell deactivation timing that is supported at the UE, a minimum time duration for which one or more cells should be active or inactive, a quantity of cells on which dynamic cell activation or deactivation is supported, or any combinations thereof.

25. The apparatus of claim 23, wherein the instructions to transmit the indication of the UE capability via the UE assistance information message are executable by the processor to cause the apparatus to:

transmit the UE assistance information message associated with dynamic cell activation or deactivation via uplink control information via a medium access control (MAC) control element, via a physical uplink shared channel (PUSCH) payload, or via both.

26. An apparatus for wireless communication at a network entity, comprising:

a processor;

memory coupled with the processor; and instructions stored in the memory and executable by the processor to cause the apparatus to:

transmit, to a user equipment (UE), configuration information for communications via a set of multiple cells, wherein at least a first cell of the set of multiple cells is configured for dynamic cell activation or deactivation for communications with the UE based at least in part on control information received at the UE;

receive, from the UE via a UE assistance information message, an indication of a UE capability associated with the dynamic cell activation or deactivation of at least the first cell and an indication of one or more cell IDs for one or more cells that are requested for dynamic cell activation or deactivation;

transmit a downlink control information communication that indicates for the UE to perform an activation or a deactivation of the first cell in accordance with the UE capability and in accordance with the one or more cell IDs requested for dynamic cell activation or deactivation indicated via the UE assistance information message including an ID of the first cell; and communicate with the UE via the set of multiple cells based at least in part on the dynamic cell activation or deactivation indicated by the downlink control information communication.

27. The apparatus of claim 26, wherein the instructions to receive the indication of the UE capability are executable by the processor to cause the apparatus to:

receive a capability indication communication that indicates the dynamic cell activation or deactivation is supported at the UE; and receive, with the capability indication communication, one or more of a cell activation timing that is supported at the UE, a cell deactivation timing that is supported at the UE, a minimum time duration for which one or more cells should be active or inactive, a quantity of cells on which dynamic cell activation or deactivation is supported, or any combinations thereof.

28. The apparatus of claim 26, wherein the instructions to receive the indication of the UE capability via the UE assistance information message are executable by the processor to cause the apparatus to:

receive the UE assistance information message associated with dynamic cell activation or deactivation via uplink control information via a medium access control (MAC) control element, via a physical uplink shared channel (PUSCH) payload, or via both.

* * * * *